US012795628B2

(12) United States Patent
Yamamoto et al.

(10) Patent No.: US 12,795,628 B2
(45) Date of Patent: Nov. 10, 2026

(54) USER EQUIPMENT, BASE STATION, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventors: Tomoyuki Yamamoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 18/485,007

(22) Filed: Oct. 11, 2023

(65) Prior Publication Data

US 2024/0089941 A1 Mar. 14, 2024

Related U.S. Application Data

(63) Continuation of application No. PCT/JP2022/017496, filed on Apr. 11, 2022.

(30) Foreign Application Priority Data

Apr. 16, 2021 (JP) ................................ 2021-069652

(51) Int. Cl.
*H04W 72/0453* (2023.01)
*H04W 48/20* (2009.01)
(Continued)

(52) U.S. Cl.
CPC ....... *H04W 72/0453* (2013.01); *H04W 48/20* (2013.01); *H04W 72/232* (2023.01); *H04W 72/563* (2023.01); *H04W 76/20* (2018.02)

(58) Field of Classification Search
None
See application file for complete search history.

(56) References Cited

U.S. PATENT DOCUMENTS 10,764,957 B2 * 9/2020 Jha ........................ H04W 76/15
2016/0037520 A1 * 2/2016 Wang ................. H04W 72/541
370/329

(Continued)

FOREIGN PATENT DOCUMENTS

EP 3175663 A1 6/2017
EP 3764717 A2 1/2021
JP 2017523716 A 8/2017

OTHER PUBLICATIONS

R2-2100474 [post112-e][256][Multi-SIM] Network switching details (vivo), vivo discussion LTE_NR_MUSIM-Core, pp. 1-47, Jan. 25-Feb. 5, 2021.

(Continued)

*Primary Examiner* — Srinivasa R Reddivalam
(74) *Attorney, Agent, or Firm* — Harness, Dickey & Pierce, P.L.C.

(57) ABSTRACT

A user equipment configured to communicate with a plurality of networks using a plurality of subscriber identification modules comprises: a first communicator including a receiver configured to receive a radio signal in a first frequency band; a second communicator including a receiver configured to receive a radio signal in a second frequency band; and a controller configured to, in a case where the first communicator is used for communication with a first network included in the plurality of networks, control the second communicator to transmit frequency-related information based at least on a use frequency that is a frequency used by the first communicator in the first frequency band to a base station of a second network included in the plurality of networks.

6 Claims, 24 Drawing Sheets

Reception of the *RRCSetup* by the UE

The UE shall perform the following actions upon reception of the *RRCSetup*:

...

1> set the content of *RRCSetupComplete* message as follows:

...

2> if the UE supports Multi-SIM capability and has multiple RX chain:

3> if the UE is already camping on or connecting to any network(s) with the other subscriber identity:

4> include *UE-DeprioritizedFrequencyList* in the *RRCSetupComplete* message;

(51) Int. Cl.

| | |
|---|---|
| ***H04W 72/232*** | (2023.01) |
| ***H04W 72/563*** | (2023.01) |
| ***H04W 76/20*** | (2018.01) |

(56) References Cited

U.S. PATENT DOCUMENTS

| | | | | |
|---|---|---|---|---|
| 2020/0329523 | A1* | 10/2020 | Yi | H04W 8/24 |
| 2021/0014667 | A1* | 1/2021 | Lovlekar | H04W 12/72 |
| 2022/0191779 | A1* | 6/2022 | Bergqvist | H04W 48/18 |
| 2022/0361132 | A1* | 11/2022 | Gurumoorthy | H04W 60/005 |
| 2023/0300738 | A1* | 9/2023 | Liu | H04W 48/20<br>370/329 |

OTHER PUBLICATIONS

TS 38.304 (v16.4.0) NR; User Equipment (UE) procedures in idle mode and in RRC Inactive state, pp. 1-39, Mar. 2021.

TS 38.331 (v16.4.0) NR; Radio Resource Control (RRC); Protocol specification, pp. 1-949, Mar. 2021.

R2-2101951 Report on LTE legacy, Mobility, DCCA, Multi-SIM and RAN slicing Vice Chairman (Nokia), pp. 1-79, Jan. 25-Feb. 5, 2021.

R2-2009265 3GPPTSG RAN WG2 #112-e, pp. 1-7, Nov. 2-Nov. 13, 2020.

* cited by examiner

FIG. 7

Reception of the *RRCSetup* by the UE

The UE shall perform the following actions upon reception of the *RRCSetup*:

...

1 > set the content of *RRCSetupComplete* message as follows:

...

2> if the UE supports Multi-SIM capability and has multiple RX chain:

3> if the UE is already camping on or connecting to any network(s) with the other subscriber identity:

4> include *UE-DeprioritizedFrequencyList* in the *RRCSetupComplete* message;

FIG. 8

***RRCSetupComplete* message**

```
RRCSetupComplete-v1610-IEs ::=      SEQUENCE {
...
    nonCriticalExtension                RRCSetupComplete-v18xy-IEs              OPTIONAL
}
...
RRCSetupComplete-v18xy-IEs ::=      SEQUENCE {
    ue-DeprioritizedFrequencyList-r18   UE-DeprioritizedFrequencyList-r18       OPTIONAL,
    nonCriticalExtension                SEQUENCE {}                             OPTIONAL
}

UE-DeprioritizedFrequencyList-r18 ::=   SEQUENCE (SIZE (1..maxFreq)) OF UE-DeprioritizedFrequency

UE-DeprioritizedFrequency-r18 ::=       SEQUENCE {
    deprioritizedFreq-r18                   CHOICE {
        deprioritizedFreqEutra-r18              UE-DeprioritizedFrequencyEUTRA-r18,
        deprioritizedFreqNR-r18                 UE-DeprioritizedFrequencyNR-r18
    },
    ...
}

UE-DeprioritizedFrequencyEUTRA-r18 ::=  SEQUENCE {
    frequency-r18                           ARFCN-ValueEUTRA,
    ...
}

UE-DeprioritizedFrequencyNR-r18 ::=     SEQUENCE {
    frequency-r18                           ARFCN-ValueNR,
    ...
}
```

| RRCSetupComplete-IEs field descriptions |
| --- |
| **UE-DeprioritizedFrequencyList**<br>Indicates the list of frequency which is not preferred by the UE to camp (e.g. UE is camping on the frequency in the other NW in case of Multi-SIM). |

FIG. 10

Reception of an *RRCReconfiguration* by the UE

The UE shall perform the following actions upon reception of the *RRCReconfiguration*, or upon execution of the conditional reconfiguration (CHO or CPC):

…

1> set the content of the *RRCReconfigurationComplete* message as follows:

…

2> if the UE supports Multi-SIM capability and has multiple RX chain:

3> if the UE is already camping on any network(s) with the other subscriber identity:

4> include *UE-DeprioritizedFrequencyList* in the *RRCReconfigurationComplete* message;

FIG. 11

*RRCReconfigurationComplete message*

```
RRCReconfigurationComplete-v1610-IEs ::=    SEQUENCE {
    ue-MeasurementsAvailable-r16            UE-MeasurementsAvailable-r16          OPTIONAL,
    needForGapsInfoNR-r16                   NeedForGapsInfoNR-r16                 OPTIONAL,
    nonCriticalExtension                    RRCReconfigurationComplete-v18xy-IEs  OPTIONAL
}

RRCReconfigurationComplete-v18xy-IEs ::=    SEQUENCE {
    ue-DeprioritizedFrequencyList-r18       UE-DeprioritizedFrequencyList-r18     OPTIONAL,
    nonCriticalExtension                    SEQUENCE {}                           OPTIONAL
}

UE-DeprioritizedFrequencyList-r18 ::=       SEQUENCE (SIZE (1..maxFreq)) OF UE-DeprioritizedFrequency

UE-DeprioritizedFrequency-r18 ::=           SEQUENCE {
    deprioritizedFreq-r18                   CHOICE {
        deprioritizedFreqEutra-r18              UE-DeprioritizedFrequencyEUTRA-r18,
        deprioritizedFreqNR-r18                 UE-DeprioritizedFrequencyNR-r18
    },
    ...
}

UE-DeprioritizedFrequencyEUTRA-r18 ::=      SEQUENCE {
    frequency-r18                           ARFCN-ValueEUTRA,
    ...
}

UE-DeprioritizedFrequencyNR-r18 ::=         SEQUENCE {
    frequency-r18                           ARFCN-ValueNR,
    ...
}
```

| *RRCReconfigurationComplete-IEs* field descriptions |
|---|
| **UE-DeprioritizedFrequencyList**<br>Indicates the list of frequency which is not preferred by the UE to camp (e.g. UE is camping on the frequency in the other NW in case of Multi-SIM). |

FIG. 13

Reception of the *RRCReestablishment* by the UE

The UE shall:

...

1> set the content of *RRCReestablishmentComplete* message as follows:

...

2> if the UE supports Multi-SIM capability and has multiple RX chain:

3> if the UE is already camping on any network(s) with the other subscriber identity:

4> include *UE-DeprioritizedFrequencyList* in the *RRCReestablishmentComplete* message;

FIG. 14

***RRCReestablishmentComplete* message**

```
RRCReestablishmentComplete-v1610-IEs ::=    SEQUENCE {
   ue-MeasurementsAvailable-r16              UE-MeasurementsAvailable-r16                  OPTIONAL,
   nonCriticalExtension                      RRCReestablishmentComplete-v18xy-IEs          OPTIONAL
}

RRCReestablishmentComplete-v18xy-IEs ::=    SEQUENCE {
   ue-DeprioritizedFrequencyList-r18         UE-DeprioritizedFrequencyList-r18             OPTIONAL,
   nonCriticalExtension                      SEQUENCE {}                                   OPTIONAL
}

UE-DeprioritizedFrequencyList-r18 ::=   SEQUENCE (SIZE (1..maxFreq)) UE-Deprioritized OF UE-DeprioritizedFrequency

UE-DeprioritizedFrequency-r18 ::=           SEQUENCE {
   deprioritizedFreq-r18                     CHOICE {
      deprioritizedFreqEutra-r18                UE-DeprioritizedFrequencyEUTRA-r18,
      deprioritizedFreqNR-r18                   UE-DeprioritizedFrequencyNR-r18
   },
   ...
}

UE-DeprioritizedFrequencyEUTRA-r18 ::=      SEQUENCE {
   frequency-r18                                ARFCN-ValueEUTRA,
   ...
}

UE-DeprioritizedFrequencyNR-r18 ::=         SEQUENCE {
   frequency-r18                                ARFCN-ValueNR,
   ...
}
```

| *RRCReestablishmentComplete-IEs* field descriptions |
|---|
| ***UE-DeprioritizedFrequencyList***<br>Indicates the list of frequency which is not preferred by the UE to camp (e.g. UE is camping on the frequency in the other NW in case of Multi-SIM). |

FIG. 16

Reception of the *RRCResume* by the UE

The UE shall:

…

1> set the content of the of *RRCResumeComplete* message as follows:

…

2> if the UE supports Multi-SIM capability and has multiple RX chain:

3> if the UE is already camping on or connecting to any network(s) with the other subscriber identity:

4> include *UE-DeprioritizedFrequencyList* in the *RRCResumeComplete* message;

FIG. 17

*RRCResumeComplete message*

```
RRCResumeComplete-v1610-IEs ::=        SEQUENCE {
...
nonCriticalExtension                     RRCResumeComplete-v18xy-IEs                 OPTIONAL
}

RRCResumeComplete-v18xy-IEs ::=        SEQUENCE {
   ue-DeprioritizedFrequencyList-r18       UE-DeprioritizedFrequencyList-r18           OPTIONAL,
   nonCriticalExtension                    SEQUENCE {}                                 OPTIONAL
}

UE-DeprioritizedFrequencyList-r18 ::=     SEQUENCE (SIZE (1..maxFreq)) OF UE-DeprioritizedFrequency

UE-DeprioritizedFrequency-r18 ::=         SEQUENCE {
   deprioritizedFreq-r18                       CHOICE {
      deprioritizedFreqEutra-r18                    UE-DeprioritizedFrequencyEUTRA-r18,
      deprioritizedFreqNR-r18                       UE-DeprioritizedFrequencyNR-r18
   },
   ...
}

UE-DeprioritizedFrequencyEUTRA-r18 ::=  SEQUENCE {
   frequency-r18                              ARFCN-ValueEUTRA,
   ...
}

UE-DeprioritizedFrequencyNR-r18 ::=       SEQUENCE {
   frequency-r18                              ARFCN-ValueNR,
   ...
}
```

| RRCResumeComplete-IEs field descriptions |
| --- |
| ***UE-DeprioritizedFrequencyList***<br>Indicates the list of frequency which is not preferred by the UE to camp (e.g. UE is camping on the frequency in the other NW in case of Multi-SIM). |

FIG. 19

Reception of the *UEInformationRequest* message

Upon receiving the *UEInformationRequest* message, the UE shall, only after successful security activation:

...

1> if *ueDeprioritizedFreqReq* is set to *true*:

2> if the UE supports Multi-SIM capability and has multiple RX chain:

3> if the UE is already camping on or connecting to any network(s) with the other subscriber identity:

4> include *UE-DeprioritizedFrequencyList* in the *UEInformationResponse* message;

FIG. 20

*UEInformationRequest message*

```
UEInformationRequest-r16-IEs ::= SEQUENCE {
..
    nonCriticalExtension           UEInformationRequest-r18xy-IEs          OPTIONAL
}

UEInformationRequest-r18xy-IEs ::= SEQUENCE {
    ueDeprioritizedFreqReq-r18     ENUMERATED(true)                        OPTIONAL, -- Need N
    nonCriticalExtension           SEQUENCE {}                             OPTIONAL
}
```

| *UEInformationRequest-IEs* field descriptions |
| --- |
| *ueDeprioritizedFreqReq*<br>This field is used to indicate whether the UE shall report information about UE preference to de-prioritize the frequency band to camp on |

FIG. 21

*UEInformationResponse message*

```
UEInformationResponse-r16-IEs ::=    SEQUENCE {
...
   nonCriticalExtension                UEInformationResponse-r18xy-IEs            OPTIONAL
}

UEInformationResponse-r18xy-IEs ::=      SEQUENCE {
   ue-DeprioritizedFrequencyList-r18      UE-DeprioritizedFrequencyList-r18           OPTIONAL,
   nonCriticalExtension                    SEQUENCE {}                                 OPTIONAL
}

UE-DeprioritizedFrequencyList-r18 ::=    SEQUENCE (SIZE (1..maxFreq)) OF UE-DeprioritizedFrequency

UE-DeprioritizedFrequency-r18 ::=        SEQUENCE {
   deprioritizedFreq-r18                   CHOICE {
      deprioritizedFreqEutra-r18              UE-DeprioritizedFrequencyEUTRA-r18,
      deprioritizedFreqNR-r18                 UE-DeprioritizedFrequencyNR-r18
   },
   ...
}

UE-DeprioritizedFrequencyEUTRA-r18 ::=   SEQUENCE {
   frequency-r18                            ARFCN-ValueEUTRA,
   ...
}

UE-DeprioritizedFrequencyNR-r18 ::=      SEQUENCE {
   frequency-r18                            ARFCN-ValueNR,
   ...
}
```

| UEInformationResponse-IEs field descriptions |
| --- |
| ***UE-DeprioritizedFrequencyList***<br>Indicates the list of frequency which is not preferred by the UE to camp (e.g. UE is camping on the frequency in the other NW in case of Multi-SIM). |

FIG. 23

Initiation

Upon initiating the procedure, the UE shall:

...

1> if configured to provide information on de-prioritizing the frequency band to camp:

2> initiate transmission of the *UEAssistanceInformation* message in accordance with 5.7.4.3 to provide information on de-prioritizing the frequency band to camp;

Actions related to transmission of *UEAssistanceInformation* message

The UE shall set the contents of the *UEAssistanceInformation* message as follows:

...

1> if transmission of the *UEAssistanceInformation* message is initiated to provide information on de-prioritizing the frequency band to camp according to 5.7.4.2 or 5.3.5.3:

2> include *UE-DeprioritizedFrequencyList* in the *UEAssistanceInformation* message;

FIG. 24

*UEAssistanceInformation message*

```
UEAssistanceInformation-v1610-IEs ::= SEQUENCE {
...
   nonCriticalExtension              UEAssistanceInformation-v18xy-IEs                OPTIONAL
}
...

UEAssistanceInformation-v18xy-IEs ::=    SEQUENCE {
   ue-DeprioritizedFrequencyList-r18      UE-DeprioritizedFrequencyList-r18            OPTIONAL,
   nonCriticalExtension                   SEQUENCE {}                                  OPTIONAL
}

UE-DeprioritizedFrequencyList-r18 ::=     SEQUENCE (SIZE (1..maxFreq)) OF UE-DeprioritizedFrequency

UE-DeprioritizedFrequency-r18 ::=         SEQUENCE {
   deprioritizedFreq-r18                  CHOICE {
      deprioritizedFreqEutra-r18             UE-DeprioritizedFrequencyEUTRA-r18,
      deprioritizedFreqNR-r18                UE-DeprioritizedFrequencyNR-r18
   },
   ...
}

UE-DeprioritizedFrequencyEUTRA-r18 ::=    SEQUENCE {
   frequency-r18                             ARFCN-ValueEUTRA,
   ...
}

UE-DeprioritizedFrequencyNR-r18 ::=       SEQUENCE {
   frequency-r18                          ARFCN-ValueNR,
   ...
}
```

| *UEAssistanceInformation* field descriptions |
| --- |
| ***UE-DeprioritizedFrequencyList*** Indicates the list of frequency which is not preferred by the UE to camp (e.g. UE is camping on the frequency in the other NW in case of Multi-SIM). |

USER EQUIPMENT, BASE STATION, AND COMMUNICATION CONTROL METHOD

CROSS-REFERENCE TO RELATED APPLICATIONS

The present application is a continuation application of international Patent Application No. PCT/JP2022/017496, filed on Apr. 11, 2022, which designated the U.S., and claims the benefit of priority of Japanese Patent Application No. 2021-069652, filed on Apr. 16, 2021, the entire contents of which are incorporated herein by reference.

TECHNICAL FIELD

The present disclosure relates to a user equipment, a base station, and a communication control method used in a mobile communication system.

BACKGROUND ART

In Release 17 of 3rd Generation Partnership Project (registered trademark. The same applies hereinafter), which is a mobile communication system standardization project, a work item has been launched for designing a function for a user equipment equipped with a plurality of subscriber identification modules to perform data communication while existing in networks of a plurality of communication operators.

Currently, a mechanism in which the user equipment existing in the plurality of networks receives paging (that is, incoming call) is not specified in the standard specification, and depends on the implementation of the user equipment. In a case where the user equipment includes a plurality of receivers (RXs: Receivers), while one receiver is used for communication with one network (hereinafter referred to as a "first network"), it is possible to monitor paging using the other receiver in the other network (hereinafter referred to as a "second network").

However, in a case where the user equipment includes only one receiver, the user equipment misses an incoming call if the incoming call is received from the second network while one receiver communicates with the first network. In response to this, in the 3GPP standardization project, a method has been studied in which the first network configures in the user equipment an interruption period during which the communication with the first network can be temporarily interrupted in order to monitor paging of the second network while the user equipment maintaining a connection with the first network (see, for example, Non Patent Literature 1). Such an interruption period may be referred to as a "gap".

CITATION LIST

Non Patent Literature

Non Patent Literature 1: 3GPP Contribution "R2-2100474"

SUMMARY OF INVENTION

A user equipment according to a first aspect comprises: the user equipment configured to communicate with a plurality of networks using a plurality of subscriber identification modules, the user equipment comprising; a first communicator including a receiver configured to receive a radio signal in a first frequency band; a second communicator including a receiver configured to receive a radio signal in a second frequency band; and a controller configured to, in a case where the first communicator is used for communication with a first network included in the plurality of networks, control the second communicator to transmit frequency-related information based at least on a use frequency that is a frequency used by the first communicator in the first frequency band to a base station of a second network included in the plurality of networks.

A base station according to a second aspect comprises: the base station of one network included in a plurality of networks in a mobile communication system including user equipment configured to communicate with the plurality of networks using a plurality of subscriber identification modules, the base station comprising; a communicator configured to, in a case where a first communicator of the user equipment is performing communication in a first frequency band with another network included in the plurality of networks, receive frequency-related information based on a use frequency that is a frequency used by the first communicator in the first frequency band from a second communicator of the user equipment; and a controller configured to acquire the frequency-related information.

A communication control method according to a third aspect comprises: the communication control method performed by user equipment configured to communicate with a plurality of networks using a plurality of subscriber identification modules, the communication control method comprising the steps of; receiving, by a first communicator of the user equipment, a radio signal in a first frequency band; receiving, by a second communicator of the user equipment, a radio signal in a second frequency band; and in a case where the first communicator is used for communication with a first network included in the plurality of networks, controlling the second communicator to transmit frequency-related information based at least on a use frequency that is a frequency used by the first communicator in the first frequency band to a base station of a second network included in the plurality of networks.

BRIEF DESCRIPTION OF DRAWINGS

Objects, features, advantages, and the like of the present disclosure will become more apparent from the following detailed description with reference to the accompanying drawings.

FIG. 7 is a view illustrating an example of a transmission trigger of the UE according to the embodiment.

FIG. 8 is a view illustrating an example of information included in a message according to the embodiment.

FIG. 10 is a view illustrating an example of the transmission trigger of the UE according to the embodiment.

FIG. 11 is a view illustrating an example of the information included in the message according to the embodiment.

FIG. 13 is a view illustrating an example of the transmission trigger of the UE according to the embodiment.

FIG. 14 is a view illustrating an example of the information included in the message according to the embodiment.

FIG. 16 is a view illustrating an example of the transmission trigger of the UE according to the embodiment.

FIG. 17 is a view illustrating an example of the information included in the message according to the embodiment.

FIG. 19 is a view illustrating an example of the information included in the message according to the embodiment.

FIG. 20 is a view illustrating an example of the transmission trigger of the UE according to the embodiment.

FIG. 21 is a view illustrating an example of the information included in the message according to the embodiment.

FIG. 23 is a view illustrating an example of the transmission trigger of the UE according to the embodiment.

FIG. 24 is a view illustrating an example of the information included in the message according to the embodiment.

DESCRIPTION OF EMBODIMENTS

Figure 1:
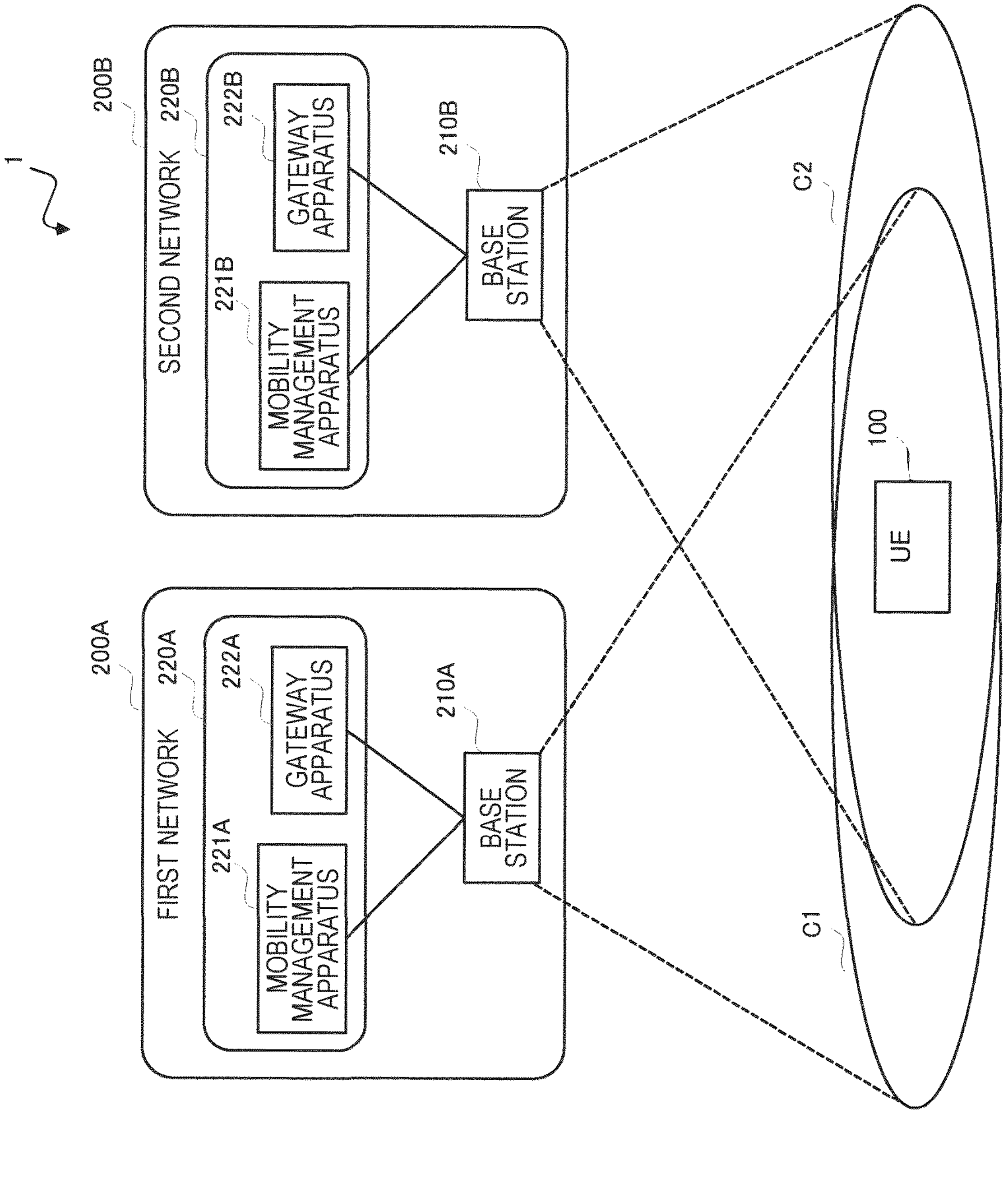
FIG. 1 is a diagram illustrating a configuration of a mobile communication system according to an embodiment.

A mobile communication system according to an embodiment will be described with reference to the drawings. In the description of the drawings, the same or similar parts are denoted by the same or similar reference numerals.

A plurality of receivers included in user equipment may have different frequency ranges for receiving radio signals. For example, it is assumed that the user equipment includes a first receiver that receives a radio signal in a first frequency band and a second receiver that receives the radio signal in a second frequency band.

In such a case, in selection operation for selecting a camp-on-cell in which the user equipment exists in a second network included in a plurality of networks when the first receiver is used for communication with a first network included in the plurality of networks, the first receiver has to be used to monitor paging from the second network if a cell belonging to a frequency that cannot be received by the second receiver in the first frequency band is selected. Since substantially only one receiver can be used although the user equipment includes the plurality of receivers, a gap needs to be set in the user equipment. The user equipment has to interrupt the communication with the first network during a period in which the gap is set, and there is a problem that the performance of the communication with the first network degrades.

Therefore, one object of the present disclosure is to provide a user equipment, a base station, and a communication control method that facilitate monitoring of paging from the second network while maintaining the communication with the first network.

(System Configuration)

A configuration of a mobile communication system 1 according to the embodiment will be described with reference to FIG. 1. Hereinafter, an example will be mainly described in which the mobile communication system 1 is a fifth generation system (5G/NR: New Radio) under the 3GPP standard. A fourth generation system (4G/LTE: Long Term Evolution) system and/or a sixth generation system may be at least partially applied to the mobile communication system 1.

As illustrated in FIG. 1, the mobile communication system 1 according to the embodiment includes a user equipment (UE (User Equipment)) 100, a first network 200A, and a second network 200B.

The UE 100 may be a mobile radio communication apparatus. The UE 100 may be an apparatus used by a user. For example, the UE 100 is a mobile phone terminal (including a smartphone), a tablet terminal, a laptop PC, a communication module (including a communication card or a chipset), a sensor or equipment provided in the sensor, a vehicle or equipment provided in the vehicle (for example, a vehicle UE), or an aerial vehicle or equipment provided in the aerial vehicle (for example, an aerial UE).

The UE 100 is a multi-SIM device supporting a plurality of subscriber identity modules (SIM (Subscriber Identity Module)). Hereinafter, an example in which the UE 100 supports two SIMS will be mainly described; however, the UE 100 may support three or more SIMs. "Supporting a plurality of SIMS" means that the UE 100 has an ability to handle a plurality of SIMS, and the UE 100 may not be necessarily equipped with the plurality of SIMS. Such a UE 100 may be referred to as a "UE supporting a plurality of SIMS". Note that the SIM is not limited to a card type SIM (so-called a SIM card), and may be an embedded SIM (so-called an eSIM) that is integrated in the UE 100 in advance. The SIM may be referred to as a USIM (Universal Subscriber Identity Module).

The first network 200A is a network associated with one SIM of the UE 100. The second network 200B is a network associated with the other SIM of the UE 100. It is assumed that the UE 100 has performed location registration in the first network 200A using one SIM and performed location registration in the second network 200B using the other SIM. That is, the UE 100 exists in each of the first network 200A and the second network 200B. The first network 200A and the second network 200B may be networks of different communication operators. However, the first network 200A and the second network 200B may be networks of the same communication operators. Different PLMN (Public Land Mobile Network) IDs may be allocated to the first network 200A and the second network 200B.

The first network 200A includes a base station 210A constituting a radio access network and a core network 220A. The core network 220A includes a mobility management apparatus 221A and a gateway apparatus 222A. Similarly, the second network 200B includes a base station 210B constituting a radio access network and a core network 220B. The core network 220B includes a mobility management apparatus 221B and a gateway apparatus 222B. Hereinafter, the base stations 210A and 200B will be simply referred to as a base station 210 when they are not distinguished, the mobility management apparatuses 221A and 221B will be simply referred to as a mobility management apparatus 221 when they are not distinguished, and the gateway apparatuses 222A and 222B will be simply referred to as a gateway apparatus 222 when they are not distinguished.

The base station 210 is a radio communication apparatus that performs radio communication with the UE 100. The base station 210 manages one or a plurality of cells. The base station 210 performs radio communication with the UE 100 that has established a connection with its cell in a radio resource control (RRC) layer. The base station 210 has a radio resource management (RRM) function, a routing function of user data (hereinafter, simply referred to as "data"), a measurement control function for mobility control and scheduling, and the like. The "cell" is used as a term indicating a minimum unit of a radio communication area. The "cell" is also used as a term indicating a function or a resource that performs radio communication with the UE 100. One cell belongs to one carrier frequency. FIG. 1 illustrates an example in which the base station 210A manages a cell C1 and the base station 210B manages a cell C2. The UE 100 is located in an overlapping region of the cell C1 and the cell C2.

A frame used in radio communication between the UE 100 and the base station 210 is, for example, 10 ms, and a system frame number (SFN (System Frame Number)) is allocated to each frame. Each frame is divided into, for example, subframes of 1 ms, and each subframe includes a plurality of OFDM (Orthogonal Frequency Division Multiplexing) symbols.

The base station 210 may be a gNB, which is a 5G/NR base station, or an eNB, which is a 4G/LTE base station. Hereinafter, an example in which the base station 210 is a gNB will be mainly described. The function of the base station 210 may be divided into a CU (Central Unit) and a DU (Distributed Unit). The base station 210 may be a relay node such as an IAB (Integrated Access and Backhaul) node.

The mobility management apparatus 221 is an apparatus supporting a control plane, and is an apparatus that performs various mobility management for the UE 100. The mobility management apparatus 221 communicates with the UE 100 using NAS (Non-Access Stratum) signaling and manages information on a tracking area in which the UE 100 exists. The mobility management apparatus 221 performs paging through the base station 210 to notify the UE 100 of an incoming call. The mobility management apparatus 221 may be an AMF (Access and Mobility Management Function) in 5G/NR or a MME (Mobility Management Entity) in 4G/LTE.

The gateway apparatus 222 is an apparatus supporting a user plane and performs transfer control of data of the UE 100. The gateway apparatus 222 may be a UPF (User Plane Function) in 5G/NR or a S-GW (Serving Gateway) in 4G/LTE.

(Configuration Example of Protocol Stack)

A configuration example of a protocol stack of the mobile communication system 1 will be described with reference to FIG. 2.

Figure 2:
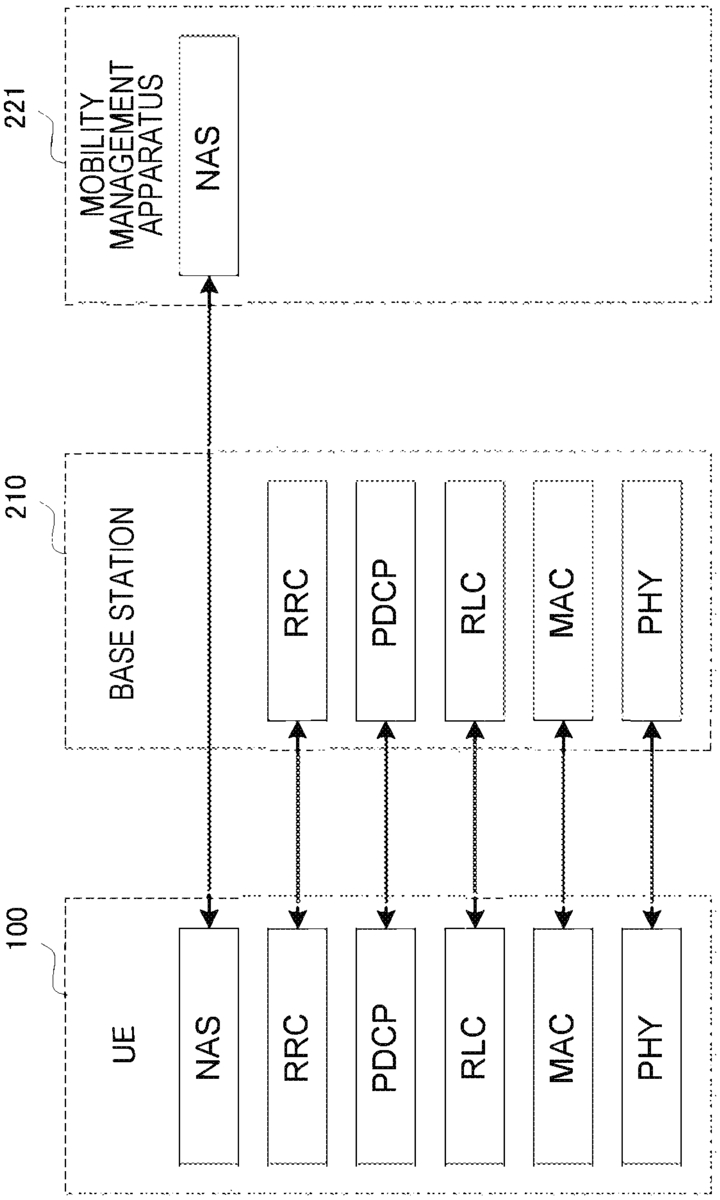
FIG. 2 is a diagram illustrating a configuration example of a protocol stack of the mobile communication system according to the embodiment.

As illustrated in FIG. 2, a protocol of a radio section between the UE 100 and the base station 210 includes a physical (PHY) layer, a MAC (Medium Access Control) layer, a RLC (Radio Link Control) layer, a PDCP (Packet Data Convergence Protocol) layer, and an RRC layer.

The PHY layer performs encoding/decoding, modulation/demodulation, antenna mapping/demapping, and resource mapping/demapping. Data and control information are transmitted via a physical channel between the PHY layer of the UE 100 and the PHY layer of the base station 210.

The MAC layer performs data priority control, retransmission processing by hybrid ARQ (HARM), a random access procedure, and the like. Data and control information are transmitted via a transport channel between the MAC layer of the UE 100 and the MAC layer of the base station 210. The MAC layer of the base station 210 includes a scheduler. The scheduler determines uplink and downlink transport formats (transport block size, modulation and coding scheme (MCS)) and allocated resources to the UE 100.

The RLC layer transmits data to the RLC layer on the reception side using the functions of the MAC layer and the PHY layer. Data and control information are transmitted via a logical channel between the RLC layer of the UE 100 and the RLC layer of the base station 210.

The PDCP layer performs header compression/decompression and encryption/decryption.

A SDAP (Service Data Adaptation Protocol) layer may be provided as an upper layer of the PDCP layer. The SDAP (Service Data Adaptation Protocol) layer performs mapping between an IP flow, a unit in which a core network performs QoS (Quality of Service) control, and a radio bearer, a unit in which an AS (Access Stratum) performs QoS control.

The RRC layer controls a logical channel, a transport channel, and a physical channel according to establishment, reestablishment, and release of the radio bearer. RRC signaling for various configurations is transmitted between the RRC layer of the UE 100 and the RRC layer of the base station 210. In a case where there is an RRC connection between the RRC of the UE 100 and the RRC of the base station 210, the UE 100 is in an RRC connected state. In a case where there is no RRC connection between the RRC of the UE 100 and the RRC of the base station 210, the UE 100 is in an RRC idle state. In a case where the RRC connection between the RRC of the UE 100 and the RRC of the base station 210 is suspended, the UE 100 is in an RRC inactive state.

The NAS layer located above the RRC layer performs session management and mobility management of the UE 100. NAS signaling is transmitted between the NAS layer of the UE 100 and the NAS layer of the mobility management apparatus 221.

Note that the UE 100 has an application layer and the like in addition to the protocol of the radio interface.

(Outline of Selection Operation)

The UE 100 can perform cell selection operation or cell reselection operation as selection operation for selecting a camp-on-cell. For example, the UE 100 can perform the selection operation in any of the following cases.

- A case where a new PLMN or a new SNPN (Stand-alone Non-Public Network) is selected
- A case where a USIM is inserted or an SNPN subscription is added to the UE 100
- A case where a suitable cell (suitable cell) is not found
- A case where the RRC connected state transitions to the RRC idle state or RRC inactive state (A) Cell Selection Operation In the cell selection operation, the UE 100 searches a frequency band to identify the strongest cell for each frequency (for example, a cell having the highest detection level of a CD-SSB (cell-defining SS (Synchronization Signal)/PBCH (Physical Broadcast CHannel) Block), a cell having the largest received power (RSRP:Reference Signal Received Power) of the CD-SSB, or a cell having the highest received quality (RSRQ:Reference Signal Received Quality) of the CD-SSB). Next, the UE 100 identifies a suitable cell from among the strongest cells. If the UE 100 cannot identify the suitable cell (that is, cannot find the suitable cell), it identifies an acceptable cell. If the UE 100 can identify the suitable cell (that is, can find the suitable cell), it selects the suitable cell as a camp-on-cell. If the UE 100 can identify only the acceptable cell (that is, can find the acceptable cell), it selects the acceptable cell as the camp-on-cell.

A suitable cell is a cell in which the measured communication quality of the cell satisfies a cell selection criterion. The PLMN of the suitable cell is a selected PLMN, registered PLMN, or a PLMN equivalent to these PLMNs. The suitable cell is not a prohibited or reserved cell and is not part of a tracking area included in a list of "prohibited tracking areas for roaming". The acceptable cell is a cell in which the measured communication quality of the cell satisfies the cell selection criterion, and is not the prohibited cell.

The cell selection criterion is, for example, Srxlev>0 and Squal>0. Srxlev represents cell selection received power. Srxlev is calculated by $Srxlev=Q_{rxlevmeas}-(Q_{rxlevmin}+Q_{rxlevminoffset})-P_{compensation}-Qoffset_{temp}$. $Q_{rxlevmeas}$ is a measured received power (RSRP) of the cell. $Q_{rxlevmin}$ is the minimum required received power. $Q_{rxlevminoffset}$ is a predetermined offset that is constantly applied. $P_{compensation}$ is a parameter related to an uplink capability. $Qoffset_{temp}$ is an offset that is temporarily applied. Squal represents a cell selection quality level. Squal is calculated by $Squal=Q_{qualmeas}-(Q_{qualmin}+Q_{qualminoffset})-Q_{offsettemp}$. $Q_{qualmeas}$ is a measured quality level (RSRQ) of the cell. $Q_{qualmin}$ is the minimum required quality level. $Q_{qualminoffset}$ is a predetermined offset that is constantly applied. $Qoffset_{temp}$ is an offset that is temporarily applied.

(B) Cell Reselection Operation

In the cell reselection operation, the UE 100 measures the communication quality of a serving cell and a neighboring cell. The UE 100 selects a camp-on-cell to be used as the serving cell, for example, based on the following criteria. The UE 100 determines the priority of the cell to be selected according to the priority of frequencies. The UE 100 may select the camp-on-cell based on the following criteria when 1 second or more passes after camping on the current serving cell.

(B1) The priority of the frequency of the neighboring cell is higher than the priority of the frequency of the current serving cell:

The UE 100 selects a cell that satisfies the relationship of $Squal>Thresh_{X}$, HighQ over a predetermined period (for example, $Treselection_{RAT}$) or a cell that satisfies the relationship of $Srxlev>Thresh_{X,\ HighP}$ over a predetermined period. Each of $Thresh_{X,\ HighP}$ and $Thresh_{X,\ HighQ}$ is a predetermined threshold.

(B2) The priority of the frequency of the neighboring cell is the same as the priority of the frequency of the current serving cell:

The UE 100 calculates a ranking Rs of the current serving cell and a ranking Rn of the neighboring cell. The UE 100 selects a cell having a ranking Rn higher than Rs over a predetermined period as the camp-on-cell.

Rs is calculated by $Rs=Q_{meas,s}+Q_{hyst}-Qoffset_{temp}$. Rn is calculated by Rn $Q_{meas,\ n}-Qoffset-Qoffset_{temp}$. $Q_{meas,\ s}$ is received power (RSRP) of the current serving cell. $Q_{meas,\ n}$ is received power (RSRP) of the neighboring cell. $Q_{hyst}$ is a hysteresis value used to facilitate the reselection of the current serving cell. $Qoffset_{temp}$ is an offset that is temporarily applied.

(B3) The priority of the frequency of the neighboring cell is lower than the priority of the frequency of the current serving cell:

The UE 100 selects a cell that satisfies the relationship of $Squal<Thresh_{X,\ LowQ}$ over a predetermined period or a cell that satisfies the relationship of $Srxlev>Thresh_{X,\ LowP}$ over a predetermined period under the assumption that the serving cell satisfies the relationship of $Squal<Thresh_{Serving,\ LowQ}$ or $Srxlev<Thresh_{Serving,\ LowP}$ over a predetermined period. Each of $Thresh_{X,\ LowP}$ and $Thresh_{X,\ LowQ}$ is a predetermined threshold.

Various parameters used for the cell selection are included in information (SIB: System Information Block) broadcast from the base station 210. The various parameters include the priority of frequencies (for example, cellReselectionPriority, cellReselectionSubPriority), a predetermined period ($Treselection_{RAT}$), various offsets ($Q_{qualminoffset}$, $Q_{rxlevminoffset}$, $Q_{offsettemp}$, $Q_{hyst}$, $Q_{offset}$), and various thresholds ($Thresh_{X,\ HighQ}$, $Thresh_{X,\ HighP}$, $Thresh_{Serving,\ LowQ}$, $Thresh_{Serving,\ LowP}$, $Thresh_{X,\ LowP}$, $Thresh_{X,\ LowQ}$) cellReselectionPriority indicates the priority of frequencies in eight stages. cellReselectionSubPriority indicates the subpriority of frequencies in four stages. As a result, a maximum of 32 priorities of frequency can be configured in the UE 100. The priority of frequencies may be sent to the UE 100 by an RRC release message. In the priority of frequencies sent by the RRC release message, the priorities of a plurality of frequencies can be designated in a list format. The priority of this frequency is prioritized over the priority of a frequency to be broadcast. The UE 100 performs the selection operation for selecting the camp-on-cell based on the information received from the base station 210.

Note that the RRC release message may include carrier information designating a frequency (for example, redirectedCarrierInfo). The carrier information may be used for the UE 100 to be redirected to a designated frequency in the cell selection operation at the time of transition to the RRC idle state or the RRC inactive state. The carrier information is prioritized over the priority of frequencies. The UE 100 preferentially selects the cell belonging to the frequency designated by the carrier information regardless of the priority of frequencies.

(Configuration Example of UE)

Figure 3:
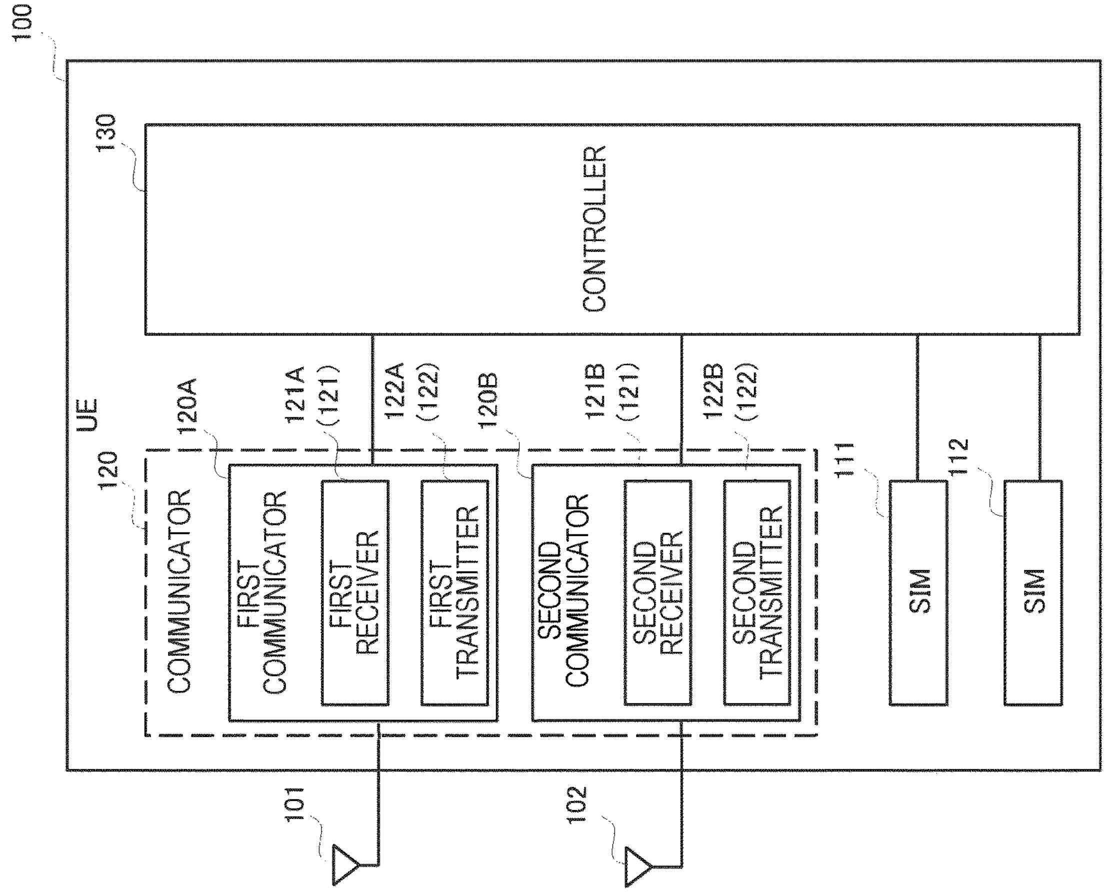
FIG. 3 is a diagram illustrating a configuration example of a UE according to the embodiment.

A configuration example of the UE 100 will be described with reference to FIGS. 3 and 4. As illustrated in FIG. 3, the UE 100 includes an antenna 101, an antenna 102, a SIM 111, a SIM 112, a communicator 120, and a controller 130. The antenna 101 and the antenna 102 may be provided outside the UE 100. The antenna 101 may be used for a first communicator 120A to be described later, and the antenna 102 may be used for a second communicator 120B to be described later. The SIM 111 and the SIM 112 are SIM cards or eSIMs.

The SIM 111 stores subscriber information and configuration information necessary for the UE 100 to communicate with the first network 200A. The SIM 111 stores identification information of the UE 100 in the first network 200A, for example, a telephone number, an IMSI (International Mobile Subscriber Identity), and the like.

The SIM 112 stores subscriber information and configuration information necessary for the UE 100 to communicate with the second network 200B. The SIM 112 stores identification information of the UE 100 in the second network 200B, for example, a telephone number, an IMSI, and the like.

The communicator 120 performs radio communication with the first network 200A and radio communication with the second network 200B via the antenna 101 under the control of the controller 130. The communicator 120 communicates with a plurality of networks using a plurality of SIMs. The communicator 120 includes the first communicator 120A and the second communicator 120B. The communicator 120 includes a plurality of receivers (RXs:Receivers) 121. In the present embodiment, the first communicator 120A includes a first receiver 121A, and the second communicator 120B includes a second receiver 121B. The communicator 120 includes a plurality of transmitters (TXs:Transmitters) 122. The communicator 120 may include only one transmitter 122. In the present embodiment, the first communicator 120A includes a first transmitter 122A, and the second communicator 120B includes a second transmitter 122B. The receiver 121 converts a radio signal received by the antenna 101 into a reception signal that is a baseband signal, performs signal processing on the reception signal, and outputs the reception signal to the controller 130. The transmitter 122 performs signal processing on a transmission signal that is a baseband signal output by the controller 130, converts the transmission signal into a radio signal, and transmits the radio signal from the antenna 101.

Figure 4:
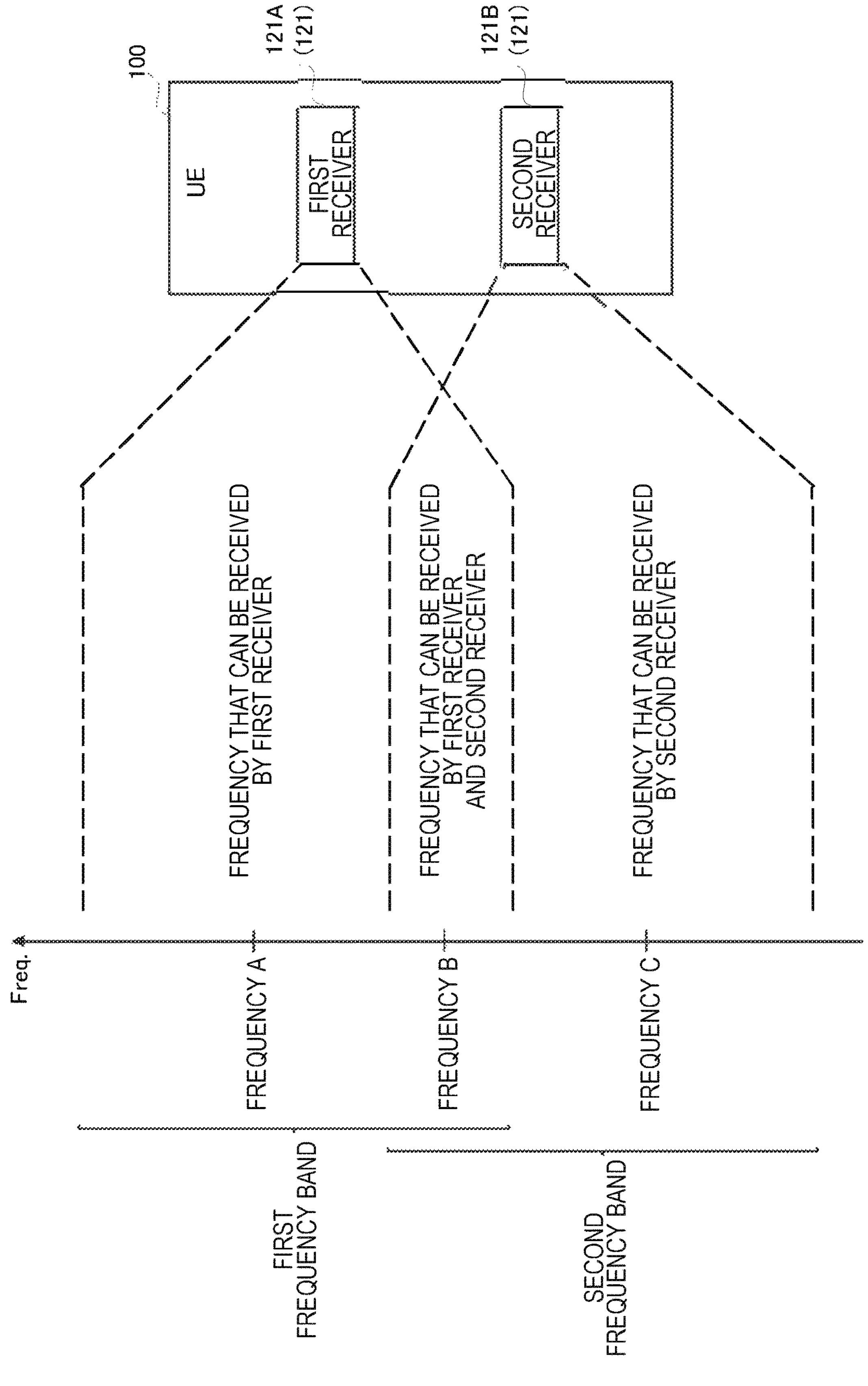
FIG. 4 is a diagram illustrating a receiver of the UE according to the embodiment.

As illustrated in FIG. 4, a frequency range in which the first receiver 121A receives a radio signal is different from a frequency range in which the second receiver 121B receives a radio signal. The first receiver 121A receives a radio signal in the first frequency band. The first receiver 121A supports the reception of a radio signal in the first frequency band, and does not support the reception of a radio signal in a frequency band other than the first frequency band. The second receiver 121B receives a radio signal in the second frequency band. The second receiver 121B supports the reception of a radio signal in the second frequency band, and does not support the reception of a radio signal in a frequency band other than the second frequency band. The first frequency band and the second frequency band partially overlap. Therefore, there are a frequency that can be received by the first receiver 121A (that is, the frequency that cannot be received by the second receiver 121B), a frequency that can be received by the first receiver 121A and the second receiver 121B, and a frequency that can be received by the second receiver 121B (that is, the frequency that cannot be received by the first receiver 121A). For example, in FIG. 4, the first frequency band includes a frequency A and a frequency B. The second frequency band includes the frequency B and a frequency C. In this case, the first receiver 121A can receive a radio signal at each of the frequency A and the frequency B, but cannot receive a radio signal at the frequency C. The second receiver 121B can receive a radio signal at each of the frequency B and the frequency C, but cannot receive a radio signal at the frequency A.

The controller 130 controls the communicator 120 and performs various types of control in the UE 100. The controller 130 controls communication with the first network 200A using the SIM 111 and controls communication with the second network 200B using the SIM 112. The controller 130 includes at least one processor and at least one memory. The memory stores a program executed by the processor and information used for processing by the processor. The memory may include at least one of a ROM (Read Only Memory), an EPROM (Erasable Programmable Read Only Memory), an EEPROM (Electrically Erasable Programmable Read Only Memory), a RAM (Random Access Memory), and a flash memory. The processor may include a digital signal processor (DSP) that performs digital processing on a digital signal and a central processing unit (CPU) that executes a program. Note that a part of the memory may be provided in the communicator 120. In addition, the DSP may be provided in the communicator 120.

In the UE 100 configured as described above, the communicator 120 communicates with the base station 210A of the first network 200A. For example, it is assumed that the UE 100 is in the RRC connected state in the cell C1 of the base station 210A of the first network 200A. In addition, it is assumed that the UE 100 is in the RRC idle state or the RRC inactive state in the cell C2 of the base station 210B of the second network 200B. Such a cell C2 may be referred to as a camp-on-cell of the UE 100. The UE 100 exists in the camp-on-cell.

In a case where the first communicator 120A is used for the communication with the first network 200A, the controller 130 controls the second communicator 120B to transmit frequency-related information based on at least a use frequency, which is a frequency used by the first communicator 120A in the first frequency band, to the base station 210B of the second network 200B. As a result, the UE 100 can notify the base station 210B of the second network 200B of the frequency-related information based on at least the use frequency used by the first communicator 120A of the UE 100 for the communication with the first network 200A. The base station 210B of the second network 200B can control selection operation for selecting a camp-on-cell in which the UE 100 exists in the second network 200B according to the frequency-related information based on at least the use frequency. When the base station 210B performs control for causing the UE 100 to preferentially select a cell belonging to the second frequency band over a cell belonging to the use frequency, the UE 100 can easily monitor paging from the second network 200B while maintaining the communication with the first network 200A. Note that the "communication with the first network 200A" may be communication with the first network 200A in the RRC connected state, or may be communication with the first network 200A in the RRC idle state or the RRC inactive state (for example, monitoring paging).

In addition, the frequency-related information may include the identifier of the use frequency. As a result, the base station 210B can find the use frequency used by the UE 100 in other networks. The base station 210B can control the selection operation for selecting the camp-on-cell in which the UE 100 exists in the second network 200B in consideration of the use frequency.

The frequency-related information may include the identifier of a frequency included in the first frequency band in addition to the identifier of the use frequency. As a result, the base station 210B can find the frequency included in the first frequency band in which the first receiver 121A of the first communicator 120A included in the UE 100 receives the radio signal. The base station 210B can control the selection operation for selecting the camp-on-cell in which the UE 100 exists in the second network 200B in consideration of the frequency included in the first frequency band.

The frequency-related information may include the identifier of a frequency not overlapping the second frequency band among frequencies included in the first frequency band, in addition to the identifier of the use frequency. As a result, the base station 210B can find the frequency not overlapping the second frequency band among the frequencies included in the first frequency band, that is, a frequency at which the second receiver 121B cannot receive a radio signal. The base station 210B can control the selection operation for selecting the camp-on-cell in which the UE 100 exists in the second network 200B in consideration of such a frequency.

In addition, the controller 130 may determine, based on the use frequency, selection priority that is the priority of frequencies in the selection operation for selecting the camp-on-cell in which the UE 100 exists in the second network 200B. The frequency-related information may include at least one set of the determined selection priority and the identifier of a frequency associated with the determined selection priority. As a result, the base station 210B can find the priority of frequencies and the frequencies in the selection operation determined by the UE 100. The base station 210B can control the selection operation for selecting the camp-on-cell in which the UE 100 exists in the second network 200B in consideration of the priority of frequencies.

In addition, the controller 130 may determine the selection priority such that the priority of the use frequency is lower than the priority of the frequency included in the second frequency band. As a result, the base station 210B can find that the priority of the use frequency is lower than the priority of the frequency included in the second frequency band. The base station 210B can control the selection operation for selecting the camp-on-cell in which the UE 100 exists in the second network 200B in consideration of the priority of the use frequency.

The controller 130 may determine the selection priority such that the priority of another frequency included in the first frequency band, in addition to the priority of the use frequency, is lower than the priority of the frequency included in the second frequency band. As a result, the base station 210B can find that another frequency included in the first frequency band, in addition to the use frequency, is lower than the priority of the frequency included in the second frequency band. The base station 210B can control the selection operation for selecting the camp-on-cell in which the UE 100 exists in the second network 200B in consideration of the priority of the frequency sent from the UE 100.

In addition, the controller 130 may determine the selection priority such that the priority of the use frequency is the lowest priority. As a result, the base station 210B can find that the priority of the use frequency is the lowest priority. The base station 210B can control the selection operation for selecting the camp-on-cell in which the UE 100 exists in the second network 200B in consideration of the priority of the use frequency.

In addition, the controller 130 determines the selection priority such that the priority of the frequency included in the first frequency band is the lowest priority. As a result, the base station 210B can find that the priority of the use frequency is the lowest priority. The base station 210B can control the selection operation for selecting the camp-on-cell in which the UE 100 exists in the second network 200B in consideration of the priority of the use frequency.

In addition, the second communicator 120B may receive a message requesting the frequency-related information from the base station 210B. The controller 130 may control, based on the message, the second communicator 120B to transmit the frequency-related information to the base station 210B. As a result, the base station 210B can control the timing of receiving the frequency-related information. The base station 210B can acquire the frequency-related information when determining the frequency to be selected by the UE 100 in the selection operation or determining the priority of the frequency in the selection operation. As a result, the base station 210B can suitably control the selection operation for selecting the camp-on-cell in which the UE 100 exists in the second network 200B in consideration of the information included in the frequency-related information.

In addition, after transmitting the frequency-related information, the second communicator 120B may receive, from the base station 210B, control information for causing the UE 100 to preferentially select the cell belonging to the second frequency band over the cell belonging to the use frequency. Based on the control information, the controller 130 may preferentially select the cell belonging to the second frequency band over the cell belonging to the use frequency in the selection operation for selecting the camping on-cell in which the UE 100 exists in the second network 200B. By selecting the cell belonging to the second frequency band as the camp-on-cell, the controller 130 can monitor paging from the second network 200B while maintaining the communication with the first network 200A.

In addition, the second communicator 120B may receive the control information from the base station 210B in an RRC message for transitioning from the first state (RRC connected state) of the UE 100 in which RRC connection is established in the second network 200B to the second state (RRC idle state or RRC inactive state) in which the RRC connection is released or suspended. As a result, since the UE 100 does not need to transmit a response to the RRC message from the base station 210B to the base station 210B, it is possible to reduce signaling between the UE 100 and the base station 210B.

In addition, the control information may designate the frequency included in the second frequency band as a frequency to which a cell to be selected by the UE 100 in the selection operation belongs. As a result, the controller 130 can select the cell belonging to the frequency included in the second frequency band designated by the control information.

In addition, the control information may indicate that the priority of the use frequency is lower than the priority of the frequency included in the second frequency band in the selection operation. As a result, since the controller 130 is unlikely to select the cell belonging to the use frequency included in the first frequency band received by the first receiver 121A, the controller 130 is likely to monitor paging from the second network 200B while maintaining the communication with the first network 200A.

Note that the operation of the functional units included in the UE 100 (specifically, at least one of the communicator 120, the first communicator 120A and the second communicator 120B, the first receiver 121A, the second receiver 121B, the first transmitter 122A, the second transmitter 122B, and the controller 130) may be described as the operation of the UE 100.

(Configuration Example of Base Station)

Figure 5:
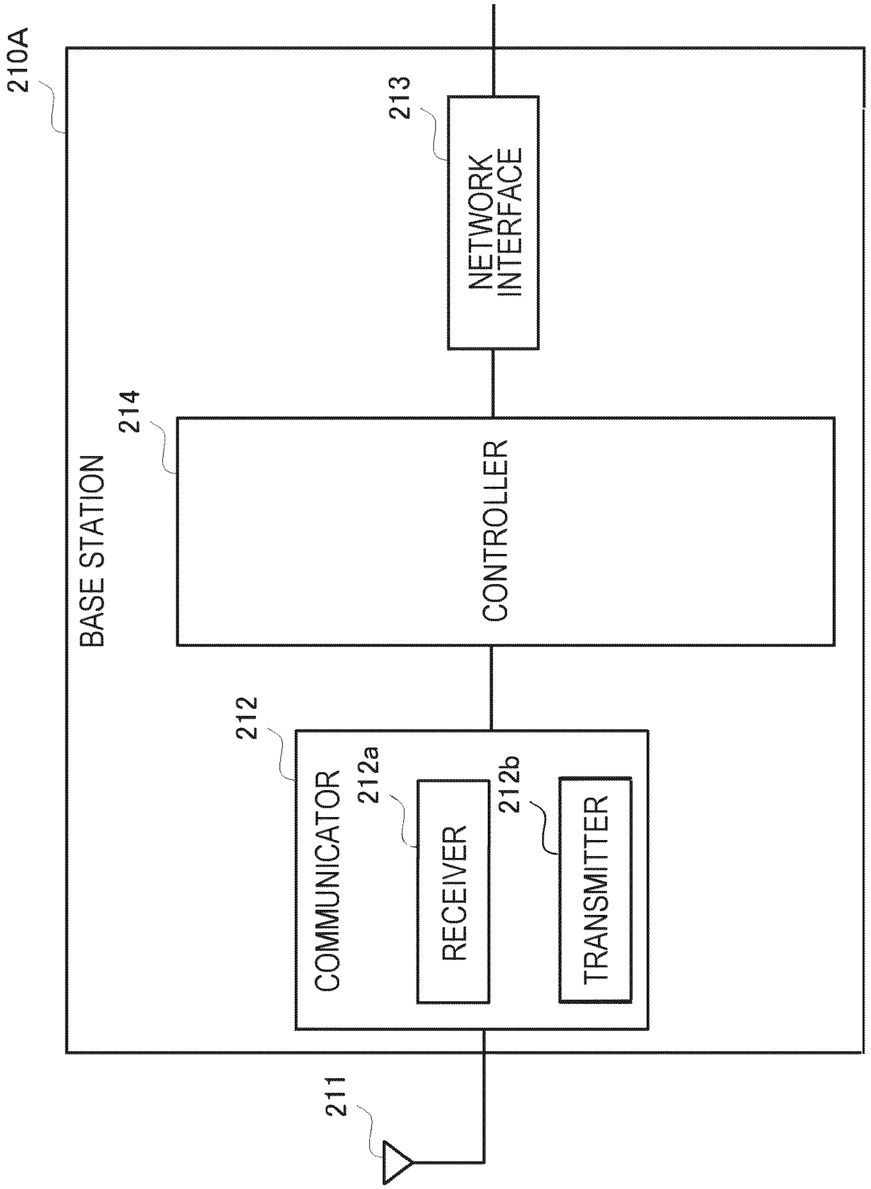
FIG. 5 is a diagram illustrating a configuration example of a base station of a first network according to the embodiment.
Figure 6:
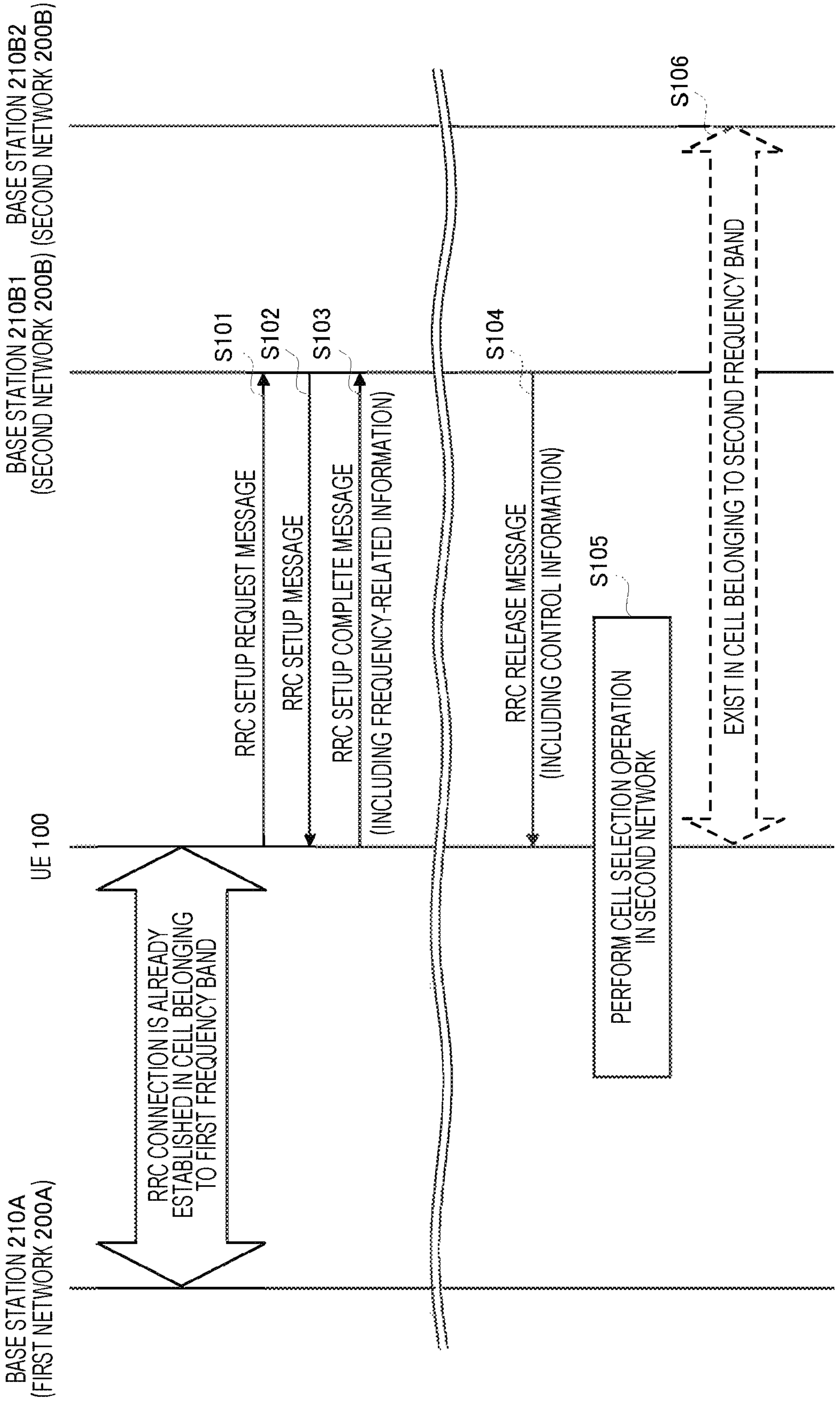
FIG. 6 is a diagram illustrating a first operation example of the mobile communication system according to the embodiment.

A configuration example of the base station 210A of the first network 200A will be described with reference to FIG. 5. Since the base station 210B of the second network 200B also has the same configuration as the base station 210A, the description thereof will be omitted. As illustrated in FIG. 5, the base station 210A includes an antenna 211, a communicator 212, a network interface 213, and a controller 214.

The communicator 212 performs communication with the UE 100 via the antenna 211 under the control of the controller 214. The communicator 212 includes a receiver 212*a* and a transmitter 212*b*. The receiver 212*a* converts a radio signal received by the antenna 211 into a reception signal that is a baseband signal, performs signal processing on the reception signal, and outputs the reception signal to the controller 214. The transmitter 212*b* performs signal processing on a transmission signal that is a baseband signal output by the controller 214, converts the transmission signal into a radio signal, and transmits the radio signal from the antenna 211.

The network interface 213 is connected to the core network 220A. The network interface 213 performs network communication with the mobility management apparatus 221A and the gateway apparatus 222A under the control of the controller 214.

The controller 214 controls the communicator 212 and performs various types of control in the base station 210A. The controller 214 includes at least one processor and at least one memory. The memory stores a program executed by the processor and information used for processing by the processor. The memory may include at least one of a ROM, an EPROM, an EEPROM, a RAM, and a flash memory. The processor may include a digital signal processor (DSP) that performs digital processing on a digital signal and a central processing unit (CPU) that executes a program. Note that a part of the memory may be provided in the communicator 212. In addition, the DSP may be provided in the communicator 212.

In the base station 210 configured as described above, in a case where the first communicator 120A of the UE 100 performs communication with another network in the first frequency band, the communicator 212 receives the frequency-related information based on the use frequency, which is the frequency used by the first communicator 120A in the first frequency band, from the second communicator 120B of the UE 100. The controller 214 acquires the frequency-related information. As a result, the base station 210 can find the frequency-related information based on at least the use frequency. Based on the frequency-related information, the base station 210B can control the selection operation for selecting the camp-on-cell in which the UE 100 exists in the second network 200B. When the base station 210B performs control for causing the UE 100 to preferentially select the cell belonging to the second frequency band over the cell belonging to the use frequency, the UE 100 can easily monitor paging from the second network 200B while maintaining the communication with the first network 200A. Since the UE 100 does not autonomously perform the selection operation, the base station 210B can suitably control the UE 100.

In addition, the controller 214 may generate, based on the frequency-related information, the control information for causing the UE 100 to preferentially select the cell belonging to the second frequency band over the cell belonging to the first frequency band. The communicator 212 may transmit the generated control information to the UE 100. As a result, since the controller 214 can generate the control information according to the frequency-related information based on the use frequency, it is possible to suitably perform control for causing the UE 100 to preferentially select the cell belonging to the second frequency band over the cell belonging to the first frequency band. As a result, the base station 210B can suitably control the UE 100.

In addition, the controller 214 may determine the frequency to which the cell to be selected by the UE 100 in the selection operation belongs based on the frequency-related information. The control information may designate the determined frequency. Since the base station 210B can designate the frequency to which the cell to be selected by the UE 100 in the selection operation belongs, the UE 100 can be suitably controlled.

In addition, the controller 214 may determine the priority of the frequency in the selection operation based on the frequency-related information. The control information may indicate the determined priority. As a result, according to the determined priority, the base station 210B can determine the cell to be finally selected by the UE 100 in the selection operation while limiting the cell to be selected by the UE 100. As a result, the base station 210B can suitably control the UE 100.

Note that the operation of the functional units included in the base station 210 (specifically, at least one of the communicator 212, the network interface 213, and the controller 214) may be described as the operation of the base station 210.

Operation of Mobile Communication System

(1) First Operation Example

A first operation example of the mobile communication system 1 will be described with reference to FIGS. 4 and 6 to 8. In the following operation description, it is assumed that the UE 100 is in the RRC connected state in the cell C1 of the base station 210A of the first network 200A, and is in the RRC idle state or the RRC inactive state in the cell C2 of the base station 210B of the second network 200B.

The UE 100 has established the RRC connection in the cell C1 belonging to the first frequency band in the first network 200A. The cell C1 is a serving cell in the first network 200A. The UE 100 uses the first communicator 120A for communication with the first network 200A. The first receiver 121A of the first communicator 120A receives a radio signal in the first frequency band. The first transmitter 122A of the first communicator 120A transmits a radio signal in the first frequency band. In this operation example, it is assumed that the UE 100 transmits and receives a radio signal at the frequency A in FIG. 4.

The UE 100 exists in (that is, camps on) the cell C2 belonging to the first frequency band or the second frequency band in the second network 200B. The UE 100 uses the second communicator 120B for communication with the second network 200B. The second receiver 121B of the second communicator 120B receives a radio signal in the second frequency band. The second transmitter 122B of the second communicator 120B transmits a radio signal in the second frequency band. Note that the cell C2 is a serving cell of the UE 100 in the second network 200B.

Step S101:

The UE 100 (the second communicator 120B) transmits an RRC setup request message to the base station 210B1. The base station 210B1 (the communicator 212) receives the RRC setup request message. The RRC setup request message is a message for requesting the establishment of the RRC connection.

The UE 100 (the controller 130) may control the second communicator 120B to transmit the RRC setup request message to the base station 210B1 to notify the base station 210B1 of the frequency-related information. For example, the UE 100 (the controller 130) may control the second communicator 120B to transmit the RRC setup request message to the base station 210B1 in response to the establishment of the RRC connection in the cell C1 belonging to the first frequency band in the first network 200A.

Step S102:

The base station 210B1 (the communicator 212) transmits an RRC setup message to the UE 100. The UE 100 (the second communicator 120B) receives the RRC setup message from the base station 210B1. The RRC setup message is a message for notifying the UE 100 of the configuration for establishing the RRC connection.

Step S103:

The UE 100 (the second communicator 120B) transmits an RRC setup complete message to the base station 210B1. The base station 210B1 (the communicator 212) receives the RRC setup complete message. The RRC setup complete message is a message for confirming that the establishment of the RRC connection has been successfully completed.

In the case where the first communicator 120A is used for communication with the first network 200A, the UE 100 (the controller 130) includes the frequency-related information in the RRC setup complete message. For example, the UE 100 (the controller 130) may determine that the first receiver 121A is used for communication with the first network 200A in at least one of the following cases.

The first receiver 121A receives a radio signal from the base station 210A of the first network 200A.

The first receiver 121A monitors a radio signal from the base station 210A of the first network 200A.

In the first network 200A, the UE 100 is in any one of the RRC connected state, the RRC idle state, and the RRC inactive state.

The UE 100 has performed location registration to the first network 200A.

The UE 100 is in a state in which it has found a suitable cell (so-called a "camped normally" state), that is, a state in which the UE exists in (that is, camps on) the suitable cell.

For example, the UE 100 (the controller 130) may determine that the first receiver 121A is not used for communication with the first network 200A in at least one of the following cases.

The first receiver 121A cannot receive a radio signal from the base station 210A of the first network 200A.

The UE 100 has not performed location registration to the first network 200A.

The UE 100 is in a state in which it has not found a suitable cell (for example, an "Any Cell Selection" state), that is, a state in which the UE does not exist in the suitable cell.

As illustrated in FIG. 7, the UE 100 (the controller 130) may include the frequency-related information (for example, UE-DeprioritizedFrequencyList) in the RRC setup complete message, for example, in a case where the UE 100 has the multi-SIM capability of supporting a plurality of SIMs and includes a plurality of receivers 121. The frequency-related information is information based on at least the use frequency, which is the frequency used by the first communicator 120A in the first frequency band.

The frequency-related information may indicate, for example, a list of frequencies including identifiers of the frequencies (for example, absolute radio frequency channel number (ARFCN)). As illustrated in FIG. 8, the frequency-related information (for example, UE-Deprioritized FrequencyList) may indicate a list of frequencies at which the UE 100 does not prefer to exist (that is, camp). The frequency-related information may indicate a list of frequencies at which the UE 100 exists in another network. Therefore, the frequency-related information may include the identifier of the use frequency.

The frequency-related information may include the identifier of a frequency included in the first frequency band in addition to the identifier of the use frequency. Taking FIG. 4 as an example, the frequency-related information may include the identifier of the frequency B together with the identifier of the frequency A.

The frequency-related information may include the identifier of a frequency not overlapping the second frequency band among frequencies included in the first frequency band, in addition to the identifier of the use frequency. Taking FIG. 4 as an example, the frequency-related information may include the identifier of the frequency A and may not include the identifier of the frequency B.

The frequency-related information may include at least one set of the selection priority (for example, cellReselectionPriority, cellReselectionSubPriority) determined by the UE 100 (the controller 130) and the identifier of the frequency associated with the determined selection priority. The selection priority is the priority of frequencies in the selection operation for selecting the camp-on-cell in which the UE 100 exists in the second network 200B.

The UE 100 (the controller 130) may determine the selection priority by at least one of the following methods (a) to (i).

(a) The UE 100 (the controller 130) determines the selection priority such that the priority of the use frequency is lower than the priority of the frequency included in the second frequency band. Taking FIG. 4 as an example, the UE 100 (the controller 130) determines the selection priority such that the priority of the frequency A is lower than the priority of the frequency C.

(b) The UE 100 (the controller 130) determines the selection priority such that the priority of another frequency included in the first frequency band is lower than the priority of the frequency included in the second frequency band. Note that the UE 100 (the controller 130) may determine the selection priorities of all the frequencies included in the first frequency band or may determine the selection priorities of some frequencies. Taking FIG. 4 as an example, the UE 100 (the controller 130) determines the selection priority such that the priority of the frequency A is lower than the priority of the frequency C. The UE 100 (the controller 130) may determine the selection priority such that the priority of the frequency B is lower than the priority of the frequency C.

(c) The UE 100 (the controller 130) may determine the selection priority such that the priority of the frequency not overlapping the second frequency band among the frequencies included in the first frequency band (hereinafter, suitably referred to as a first non-overlapping frequency) is lower than the priority of the frequency included in the second frequency band. Note that the UE 100 (the controller 130) may determine the selection priorities of all the frequencies included in the first non-overlapping frequency or may determine the selection priorities of some frequencies. The UE 100 (the controller 130) determines the selection priority such that the priority of the frequency A is lower than the priority of the frequency C. On the other hand, the UE 100 (the controller 130) maintains the priority of the frequency B without determining the priority of the frequency B to a priority lower than the priority of the frequency C.

(d) The UE 100 (the controller 130) determines the selection priority such that the priority of the use frequency is the lowest priority. Taking FIG. 4 as an example, the UE 100 (the controller 130) determines the selection priority such that the priority of the frequency A is the lowest priority.

Note that the lowest priority may be, for example, the 32nd priority in 32 stages of priorities indicated by cellReselectionPriority and cellReselectionSubPriority. Alternatively, the lowest priority may be a priority lower than the lowest priority configured by the network.

(e) The UE 100 (the controller 130) may determine the selection priority such that the priority of the frequency included in the first frequency band is the lowest priority.

Note that the UE 100 (the controller 130) may determine the selection priority such that all the frequencies included in the first frequency band are the lowest priority, or may determine the selection priority such that some frequencies are the lowest priority. Taking FIG. 4 as an example, the UE 100 (the controller 130) determines the selection priority such that the priority of the frequency A is the lowest priority. The UE 100 (the controller 130) may determine the selection priority such that the priority of the frequency B is the lowest priority.

(f) The UE 100 (the controller 130) determines the selection priority such that the priority of the frequency not overlapping the second frequency band among the frequencies included in the first frequency band (the first non-overlapping frequency) is the lowest priority. Note that the UE 100 (the controller 130) may determine the selection priority such that all the frequencies included in the first non-overlapping frequency are the lowest priority, or may determine the selection priority such that some frequencies are the lowest priority. The UE 100 (the controller 130) determines the selection priority such that the priority of the frequency A is the lowest priority. On the other hand, the UE 100 (the controller 130) maintains the priority of the frequency B without determining the priority of the frequency B to the lowest priority.

(g) The UE 100 (the controller 130) determines the selection priority such that the priority of the frequency included in the second frequency band is higher than the priority of the frequency included in the first frequency band. Note that the UE 100 (the controller 130) may determine the selection priorities of all the frequencies included in the second frequency band or may determine the selection priorities of some frequencies. Taking FIG. 4 as an example, the UE 100 (the controller 130) determines the selection priority such that the priority of the frequency C is higher than the priority of the frequency A. The UE 100 (the controller 130) may determine the selection priority such that the priority of the frequency C is higher than the priority of the frequency B. The UE 100 (the controller 130) may determine the selection priority such that the priority of the frequency B is higher than the priority of the frequency A.

(h) The UE 100 (the controller 130) determines the selection priority such that the priority of the frequency included in the second frequency band is higher than the priority of the frequency not overlapping the second frequency band among the frequencies included in the first frequency band (that is, the first non-overlapping frequency). Note that the UE 100 (the controller 130) may determine the selection priorities of all the frequencies included in the second frequency band or may determine the selection priorities of some frequencies. Taking FIG. 4 as an example, the UE 100 (the controller 130) determines the selection priority such that the priority of the frequency C is higher than the priority of the frequency A. The UE 100 (the controller 130) determines the priority of the frequency C without considering the priority of the frequency B. The UE 100 (the controller 130) may determine the selection priority such that the priority of the frequency B is higher than the priority of the frequency A.

(i) The UE 100 (the controller 130) may determine the selection priority such that the priority of the frequency included in the second frequency band is the highest priority. Note that the UE 100 (the controller 130) may determine the selection priorities of all the frequencies included in the second frequency band or may determine the selection priorities of some frequencies. Taking FIG. 4 as an example, the UE 100 (the controller 130) may determine the selection priority such that the priorities of the frequencies B and C are the highest priority.

Since the frequency-related information is sent in the RRC setup complete message, the base station 210B1 can find information based on at least the use frequency of the UE 100 in the first network 200A when starting communication between the UE 100 and the base station 210B1.

Step S104:

The base station 210B1 (the communicator 212) transmits an RRC release message to the UE 100. The UE 100 (the second communicator 120B) receives the RRC release message from the base station 210B1. The RRC release message is a message for transitioning from the RRC connected state of the UE 100 in a network to the RRC idle state in which the RRC connection is released.

The base station 210B1 (the controller 214) may include, in the RRC release message, the control information for causing the UE 100 to preferentially select the cell belonging to the second frequency band over the cell belonging to the first frequency in the selection operation. Specifically, the base station 210B1 (the controller 214) generates the control information based on the frequency-related information. The base station 210B1 (the controller 214) includes the generated control information in the RRC release message. The base station 210B1 (the communicator 212) transmits the generated control information to the UE 100 by transmitting the RRC release message to the UE 100.

The control information may designate the frequency included in the second frequency band as the frequency to which the cell to be selected by the UE 100 in the selection operation belongs. The control information is, for example, carrier information (for example, redirectedCarrierInfo) used for the UE 100 to be redirected to the designated frequency in the cell selection operation at the time of transition to the RRC idle state or the RRC inactive state.

The base station 210B1 (the controller 214) may determine the carrier information based on the frequency-related information received from the UE 100. The base station 210B1 (the controller 214) determines the frequency to which the cell to be selected by the UE 100 in the selection operation belongs based on the frequency-related information. The base station 210B1 (the controller 214) generates carrier information designating the determined frequency. The base station 210B (the controller 214) may designate, for example, a frequency other than the frequency used by the first communicator 120A as the frequency designated by the carrier information. In addition, the base station 210B (the controller 214) may designate a frequency other than the frequency included in the first frequency band. In addition, the base station 210B (the controller 214) may designate a frequency other than the frequency not overlapping the second frequency band among the frequencies included in the first frequency band.

The base station 210B (the controller 214) may designate, for example, a frequency having the highest priority among the frequencies indicated by the frequency-related information. In addition, the base station 210B1 (the controller 214) may designate a frequency other than the frequency having the lowest priority among the frequencies indicated by the frequency-related information.

The control information may include, for example, at least one set of a selection priority (for example, cellReselectionPriority, cellReselectionSubPriority), which is the priority of frequencies in the selection operation for selecting a camp-on-cell in which the UE 100 exists in the second network 200B, and the identifier of a frequency associated with the selection priority. Therefore, the control information indicates the determined selection priority.

The base station 210B1 (the controller 214) may determine the selection priority to be included in the control information based on the selection priority included in the frequency-related information. The base station 210B (the controller 214) may determine the selection priority of each frequency, for example, so as to have the same priority as the selection priority included in the frequency-related information, or may determine the selection priority of each frequency so as to be at least partially different from the selection priority included in the frequency-related information. The base station 210B1 (the controller 214) may determine the selection priority, for example, such that the selection priority included in the control information is the same as the selection priority included in the frequency-related information within an allowable range in consideration of the communication status in the second network 200B.

The control information may indicate at least one of the following, for example.

- The priority of the use frequency is lower than the priority of the frequency included in the second frequency band.
- The priority of the frequency included in the first frequency band is lower than the priority of the frequency included in the second frequency band.
- The priority of the first non-overlapping frequency is lower than the priority of the frequency included in the second frequency band.
- The priority of the use frequency is the lowest priority.
- The priority of the frequency included in the first frequency band is the lowest priority.
- The priority of the first non-overlapping frequency is the lowest priority.
- The priority of the frequency included in the second frequency band is higher than the priority of the frequency included in the first frequency band.
- The priority of the frequency included in the second frequency band is higher than the priority of the first non-overlapping frequency.
- The priority of the frequency included in the second frequency band is the highest priority.

Step S105:

The UE 100 (the controller 130) performs the cell selection operation in the second network 200B. Based on the control information, the UE 100 (the controller 130) preferentially selects the cell belonging to the second frequency band over the cell belonging to the first frequency in the selection operation. After transitioning to the RRC idle state in response to the reception of the RRC release message, the UE 100 (the controller 130) may preferentially select the cell belonging to the second frequency band over the cell belonging to the first frequency band based on the control information. For example, in a case where the control information includes the carrier information, the UE 100 (the controller 130) selects a cell belonging to the frequency designated by the carrier information as the camp-on-cell. For example, in a case where the control information includes priority information, the UE 100 (the controller 130) selects a cell belonging to a frequency having a high priority according to the priority of the frequency indicated by the priority information.

Step S106:

The UE 100 (the controller 130) exists in the cell selected in step S105. In this operation example, the UE 100 exists in the cell belonging to the second frequency band. Specifically, the UE 100 (the controller 130) exists in the cell belonging to the second frequency band, which is a cell selected in the selection operation as a cell in the second network 200B. The cell is a cell managed by a base station 210B2 of the second network 200B. The UE 100 (the second communicator 120B) existing in the cell monitors paging for example. In the monitoring of paging, it is checked whether or not there is paging addressed to the UE 100 by receiving a PDCCH (Physical Downlink Control CHannel) from the base station 210B2 of the second network 200B. Since the UE 100 (the controller 130) uses the second communicator 120B for communication with the second network 200B, paging from the second network 200B can be monitored while maintaining the communication with the first network 200A.

(2) Second Operation Example

Figure 9:
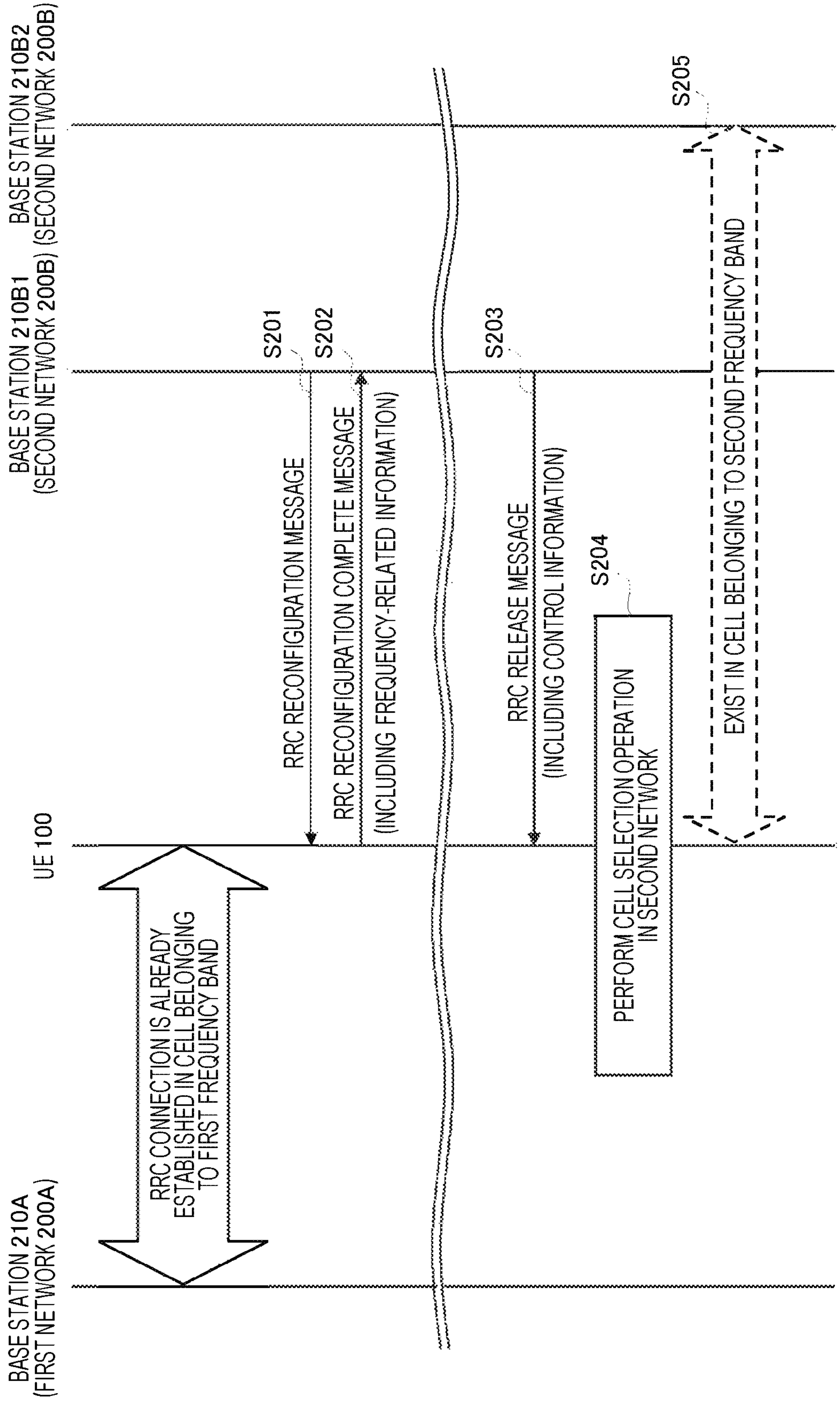
FIG. 9 is a diagram illustrating a second operation example of the mobile communication system according to the embodiment.

With reference to FIGS. 9 to 11, a second operation example of the mobile communication system 1 will be described focusing on differences from the above-described operation example. In this operation example, the UE 100 transmits the frequency-related information to the base station 210B1 by an RRC reconfiguration complete message.

In the following description of the operation, the UE 100 is in the RRC connected state in the cell C2 of the base station 210B1 of the second network 200B. Therefore, an RRC connection is established between the UE 100 and the base station 210B1.

Step S201:

The base station 210B1 (the communicator 212) transmits an RRC reconfiguration message to the UE 100. The UE 100 (the second communicator 120B) receives the RRC reconfiguration message from the base station 210B1. The RRC reconfiguration message is a message for modifying the RRC connection.

Step S202:

The UE 100 (the second communicator 120B) transmits the RRC reconfiguration complete message to the base station 210B1. The base station 210B1 (the communicator 212) receives the RRC reconfiguration complete message. The RRC reconfiguration complete message is a message for confirming that the reconfiguration of the RRC connection has been successfully completed.

In the case where the first communicator 120A is used for communication with the first network 200A, the UE 100 (the controller 130) includes the frequency-related information in the RRC reconfiguration complete message.

As illustrated in FIGS. 10 and 11, the UE 100 (the controller 130) may include the frequency-related information (for example, UE-DeprioritizedFrequencyList) in the RRC reconfiguration complete message, for example, in the case where the UE 100 has the multi-SIM capability of supporting a plurality of SIMs and includes a plurality of receivers 121.

Steps S203 to S205:

The operations in steps S203 to S205 are the same as those in the first operation example described above.

(3) Third Operation Example

Figure 12:
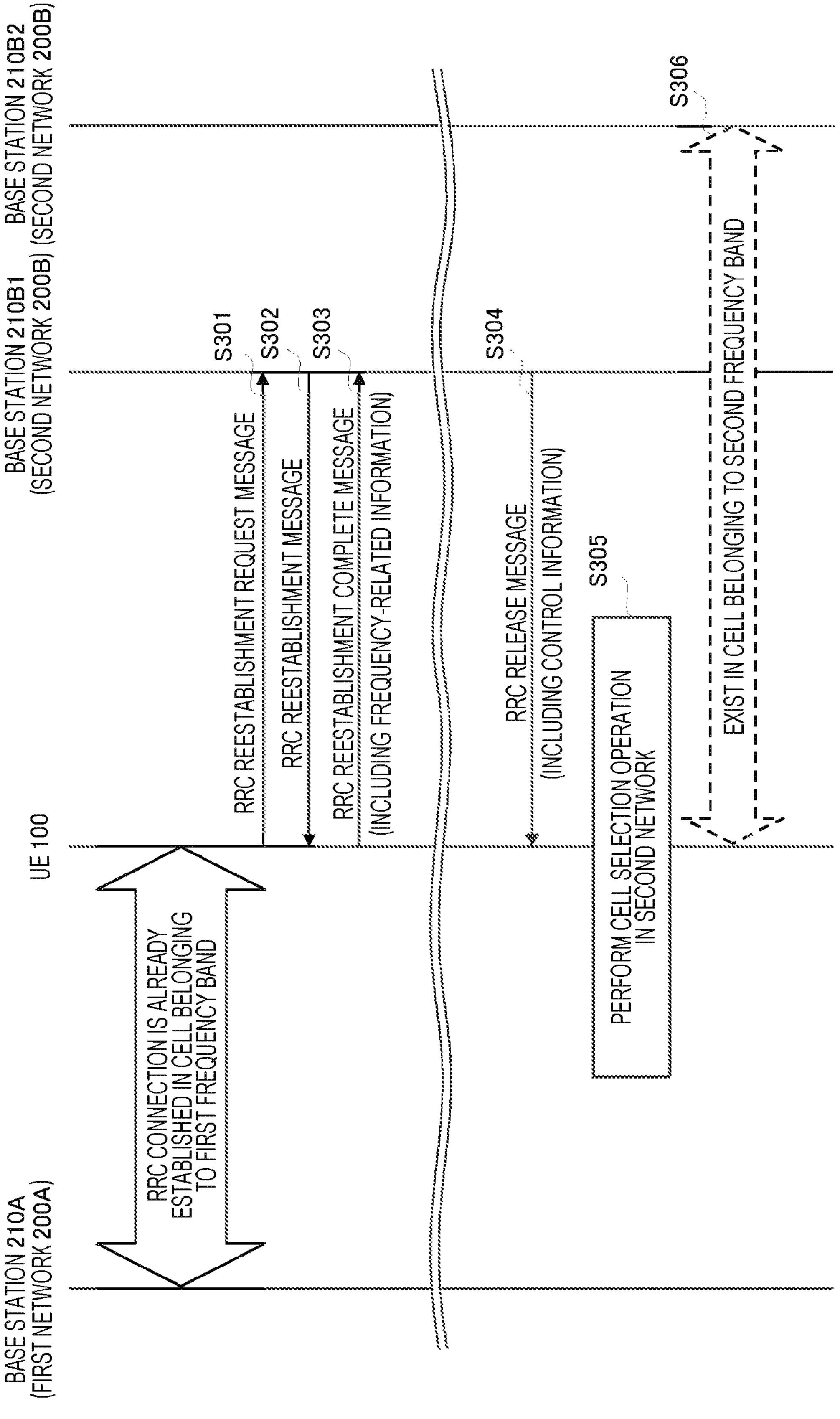
FIG. 12 is a diagram illustrating a third operation example of the mobile communication system according to the embodiment.

With reference to FIGS. 12 to 14, a third operation example of the mobile communication system 1 will be described focusing on differences from the above-described operation example. In this operation example, the UE 100 transmits the frequency-related information to the base station 210B1 by an RRC reestablishment complete message. In the following description of the operation, the UE 100 is in the RRC connected state in the cell C2 of the base station 210B1 of the second network 200B.

Step S301:

The UE 100 (the second communicator 120B) transmits an RRC reestablishment request message to the base station 210B1. The base station 210B1 (the communicator 212) receives the RRC reestablishment request message. The RRC reestablishment request message is a message for requesting the reestablishment of the RRC connection. The UE 100 (the controller 130) performs control for transmitting the RRC reestablishment request message, for example, in a case where the RRC connection needs to be maintained when a predetermined failure (for example, radio link failure, reconfiguration failure, integrity check failure, etc.) occurs.

Step S302:

The base station 210B1 (the communicator 212) transmits the RRC reestablishment message to the UE 100. The UE 100 (the second communicator 120B) receives the RRC reestablishment message from the base station 210B1. The RRC reestablishment message is a message for reestablishing the RRC connection.

Step S303:

The UE 100 (the second communicator 120B) transmits the RRC reestablishment complete message to the base station 210B1. The base station 210B1 (communicator 212) receives the RRC reestablishment complete message. The RRC reestablishment complete message is a message for confirming that the reestablishment of the RRC connection has been successfully completed.

In the case where the first communicator 120A is used for communication with the first network 200A, the UE 100 (the controller 130) includes the frequency-related information in the RRC reestablishment complete message.

As illustrated in FIGS. 13 and 14, the UE 100 (the controller 130) may include the frequency-related information (for example, UE-DeprioritizedFrequencyList) in the RRC reestablishment complete message, for example, in the case where the UE 100 has the multi-SIM capability of supporting a plurality of SIMS and includes a plurality of receivers 121.

Steps S304 to S306:

The operations in steps S304 to S306 are the same as those in the first operation example described above.

(4) Fourth Operation Example

Figure 15:
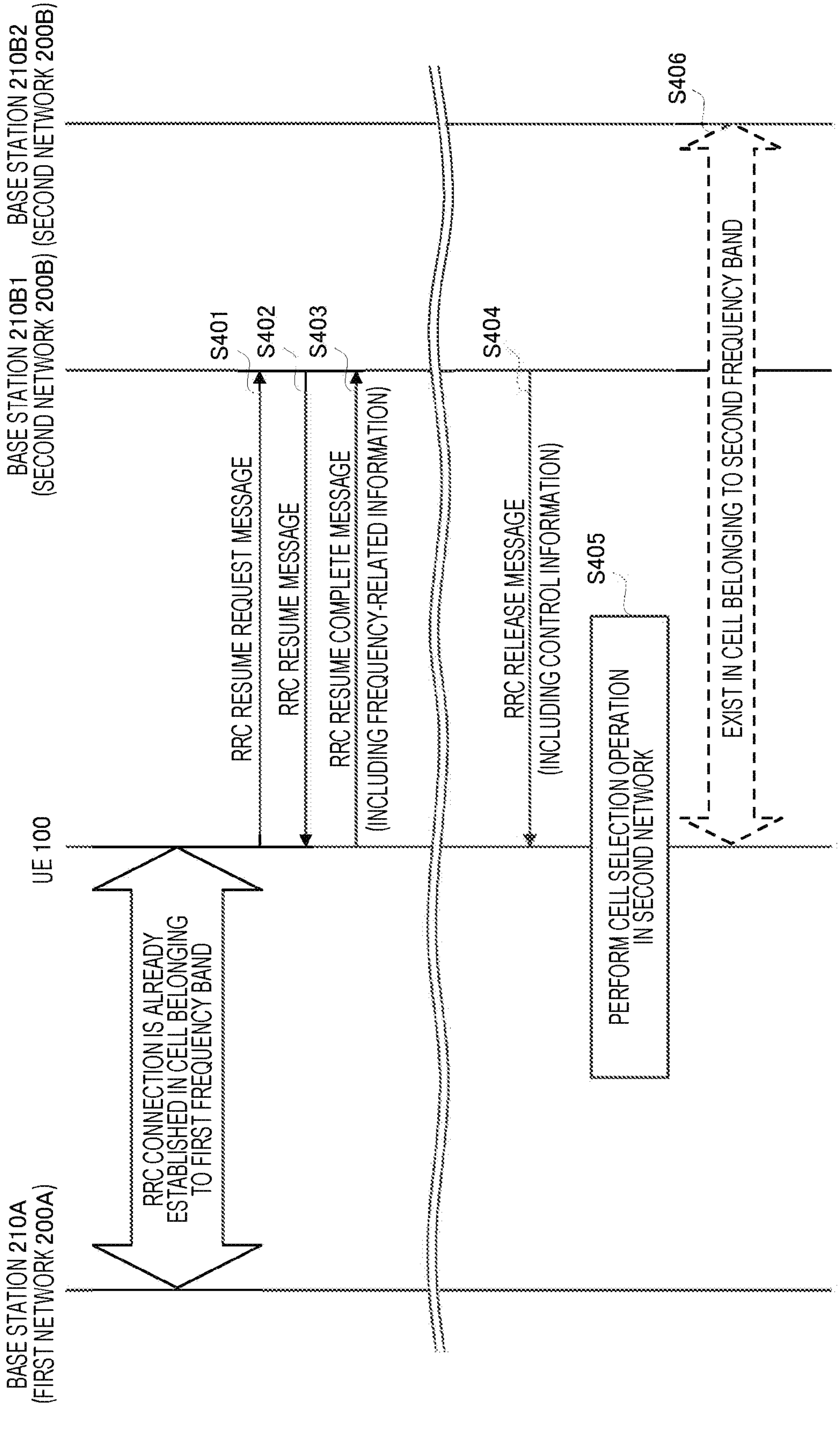
FIG. 15 is a diagram illustrating a fourth operation example of the mobile communication system according to the embodiment.
Figure 18:
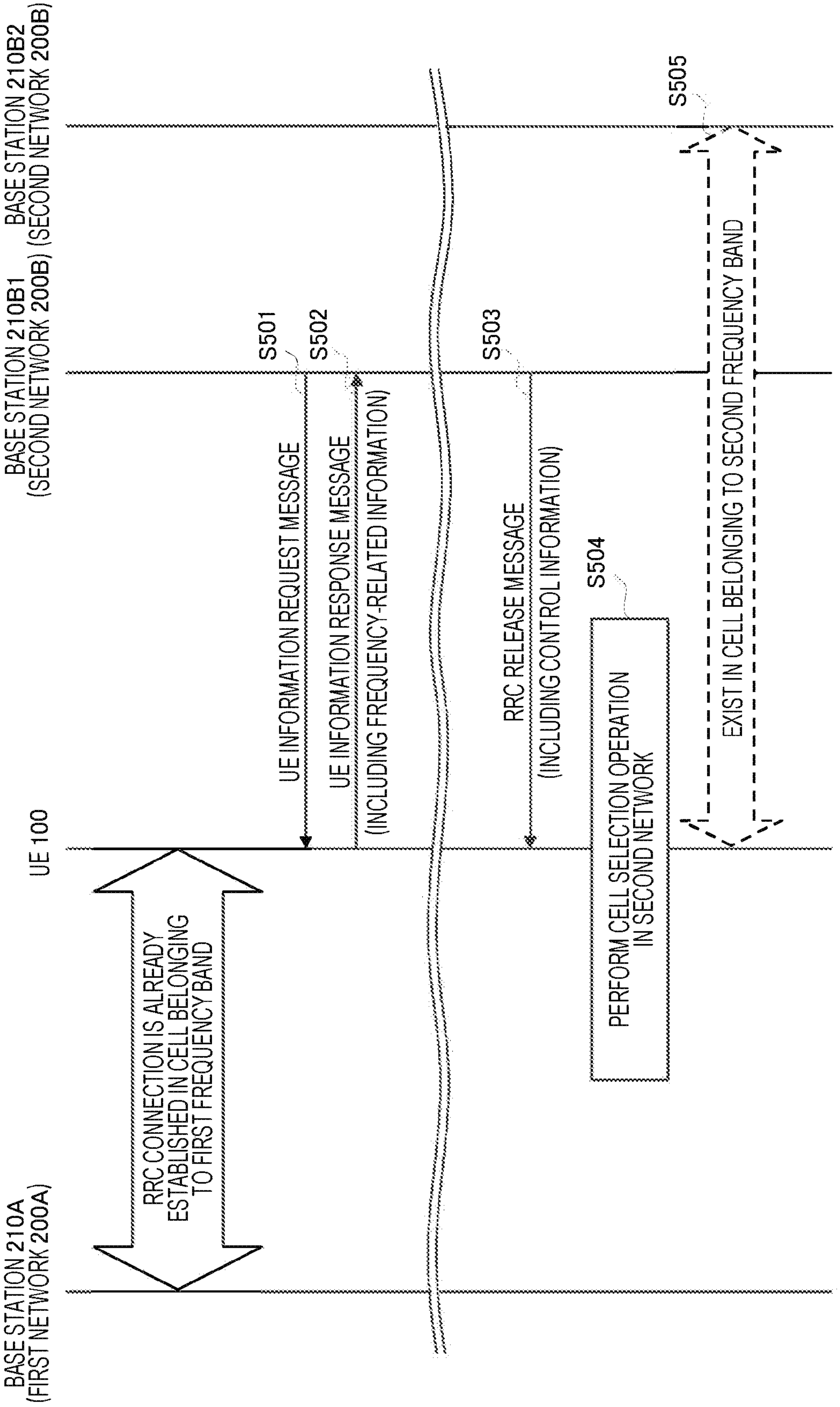
FIG. 18 is a diagram illustrating a fifth operation example of the mobile communication system according to the embodiment.

With reference to FIGS. 15 to 17, a fourth operation example of the mobile communication system 1 will be described focusing on differences from the above-described operation example. In this operation example, the UE 100 transmits the frequency-related information to the base station 210B1 by an RRC resume complete message. In the following description of the operation, the UE 100 is in the RRC inactive state in the cell C2 of the base station 210B1 of the second network 200B.

Step S401:

The UE 100 (the second communicator 120B) transmits an RRC resume request message to the base station 210B1. The base station 210B1 (the communicator 212) receives the RRC resume request message. The RRC resume request message is a message for requesting to resume a suspended RRC connection.

Step S402:

The base station 210B1 (the communicator 212) transmits an RRC resume message to the UE 100. The UE 100 (the second communicator 120B) receives the RRC resume message from the base station 210B1. The RRC resume message is a message for resuming the suspended RRC connection. The RRC resume message may be a message for requesting the execution of a RNA (RAN based Notification Area) update.

Step S403:

The UE 100 (the second communicator 120B) transmits the RRC resume complete message to the base station 210B1. The base station 210B1 (the communicator 212) receives the RRC resume complete message. The RRC resume complete message is a message for confirming that the resumption of the RRC connection has been successfully completed.

In the case where the first communicator 120A is used for communication with the first network 200A, the UE 100 (the controller 130) includes the frequency-related information in the RRC resume complete message.

As illustrated in FIGS. 16 and 17, the UE 100 (the controller 130) may include the frequency-related information (for example, UE-DeprioritizedFrequencyList) in the RRC resume complete message, for example, in the case where the UE 100 has the multi-SIM capability of supporting a plurality of SIMs and includes a plurality of receivers 121.

Steps S404 to S406:

The operations in steps S404 to S406 are the same as those in the first operation example described above.

(5) Fifth Operation Example

With reference to FIGS. 18 to 21, a fifth operation example of the mobile communication system 1 will be described focusing on differences from the above-described operation example. In this operation example, the UE 100 transmits the frequency-related information to the base station 210B1 by a UE information response message. In the following description of the operation, the UE 100 is in the RRC connected state in the cell C2 of the base station 210B1 of the second network 200B.

Step S501:

The base station 210B1 (the communicator 212) transmits a UE information request message to the UE 100. The UE 100 (the second communicator 120B) receives the UE information request message from the base station 210B1. The UE information request message is a message for the second network 200B to acquire information from the UE 100. The UE information request message may be used as a message for requesting the frequency-related information.

As illustrated in FIG. 19, the UE information request message may include information for indicating whether the UE 100 should report information about a preference of the UE 100 (for example, ueDepritizedFreqReq) in order to lower the priority of the frequency in which the UE 100 exists (that is, camps). For example, in a case where ueDepritizedFreqReq is set to "true," the UE 100 (the controller 130) may determine that the frequency-related information should be reported.

Step S502:

The UE 100 (the second communicator 120B) transmits the UE information response message to the base station 210B1. The base station 210B1 (the communicator 212) receives the UE information response message. The UE information response message is a message for transmitting information requested by the second network 200B.

In the case where the first communicator 120A is used for communication with the first network 200A, the UE 100 (the controller 130) includes the frequency-related information in the UE information response message.

As illustrated in FIGS. 20 and 21, the UE 100 (the controller 130) may include the frequency-related information (for example, UE-Deprioritized FrequencyList) in the UE information response message in a case where the information included in the UE information request message indicates that the UE 100 should report information about a preference of the UE 100 in order to lower the priority of the frequency in which the UE 100 exists. In addition, the UE 100 (the controller 130) may include the frequency-related information in the UE information response message, for example, in the case where the UE 100 has the multi-SIM capability of supporting a plurality of SIMs and includes a plurality of receivers 121.

Steps S503 to S505:

The operations in steps S503 to S505 are the same as those in the first operation example described above.

(6) Sixth Operation Example

Figure 22:
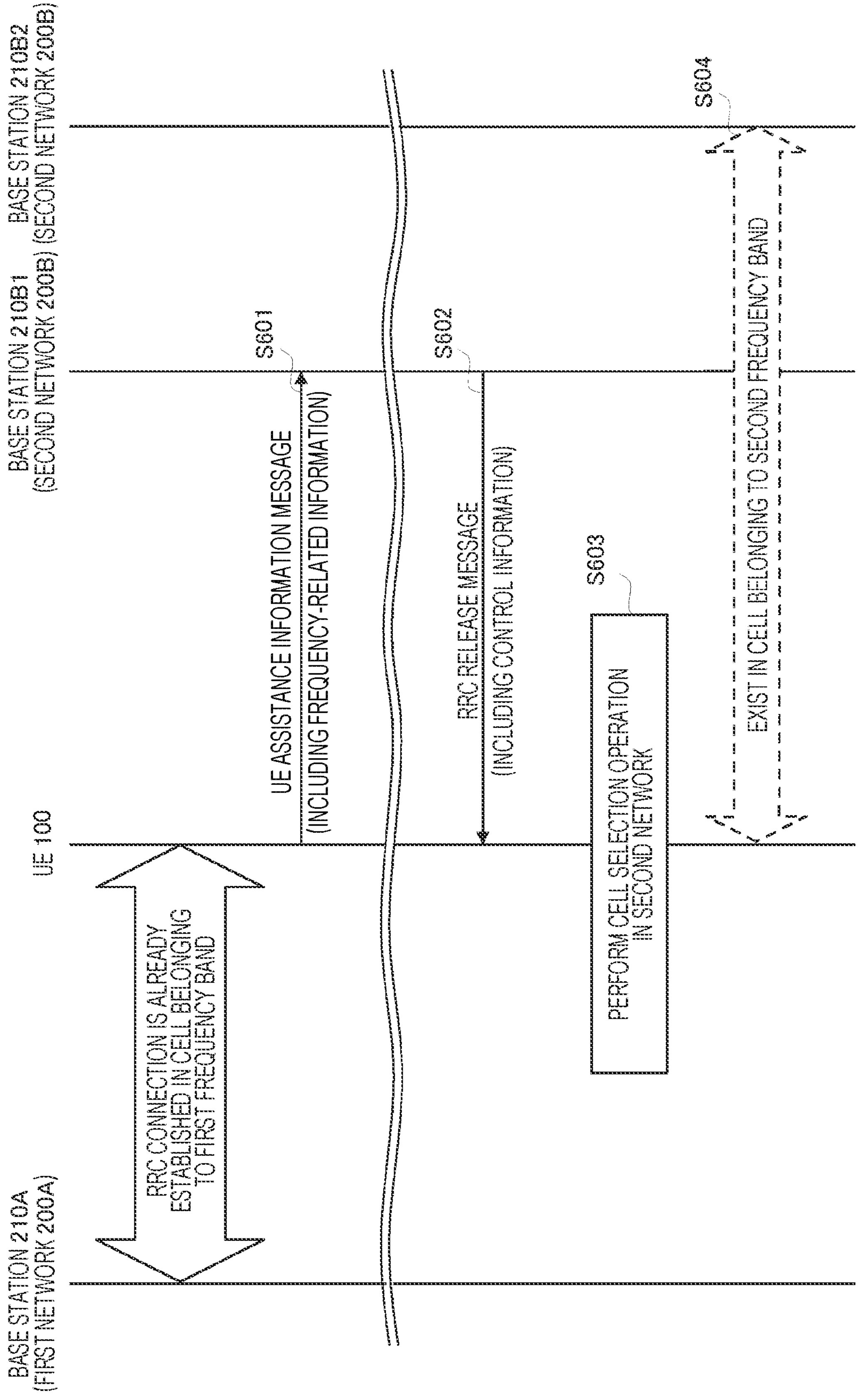
FIG. 22 is a diagram illustrating a sixth operation example of the mobile communication system according to the embodiment.

With reference to FIGS. 22 to 24, a sixth operation example of the mobile communication system 1 will be described focusing on differences from the above-described operation example. In this operation example, the UE 100 transmits the frequency-related information to the base station 210B1 by a UE assistance information message. In the following description of the operation, the UE 100 is in the RRC connected state in the cell C2 of the base station 210B1 of the second network 200B.

Step S601:

The UE 100 (the second communicator 120B) transmits the UE assistance information message to the base station 210B1. The base station 210B1 (the communicator 212) receives the UE assistance information message. The UE assistance information message is a message for indicating information of the UE 100 to the network.

In the case where the first communicator 120A is used for communication with the first network 200A, the UE 100 (the controller 130) includes the frequency-related information in the UE assistance information message.

As illustrated in FIGS. 23 and 24, the UE 100 (the controller 130) may include the frequency-related information (for example, UE-Deprioritized FrequencyList) in the UE assistance information message when the UE 100 is configured to provide information on a frequency at which UE does not prefer to exist (that is, camp). In addition, the UE 100 (the controller 130) may include the frequency-related information in the UE assistance information message, for example, in the case where the UE 100 has the multi-SIM capability of supporting a plurality of SIMs and includes a plurality of receivers 121.

Steps S602 to S604:

The operations in steps S602 to S604 are the same as those in the first operation example described above.

OTHER EMBODIMENTS

In the operation of the above-described embodiment, the first network 200A and the base station 210A may be replaced with the cell C1 (first cell), or the first network 200B and the base station 210B may be replaced with the cell C2 (second cell).

In the operation of the above-described embodiment, the number of receivers 121 may be three or more. Furthermore, the number of transmitters 122 may be one, or three or more.

In the operation of the above-described embodiment, the "frequency" may be replaced with a "frequency band". Note that the first frequency band may indicate a frequency range supported by the first receiver 121A, that is, a frequency range in which a radio signal is received by the first receiver 121A, and the second frequency band may indicate a frequency range supported by the second receiver 121B, that is, a frequency range in which a radio signal is received by the second receiver 121B. Each of the first frequency band (that is, the frequency range supported by the first receiver 121A) and the second frequency band (that is, the frequency range supported by the second receiver 121B) may include one frequency band or a plurality of frequency bands.

In the operation of the above-described embodiment, the first frequency band and the second frequency band may not overlap each other. That is, the first frequency band and the second frequency band may be separated from each other. For example, the first receiver 121A may support the reception of a radio signal in one frequency domain of a FR1 (Frequency Range 1) and a FR2 (Frequency Range 2), and the second receiver 121B may support the reception of a radio signal in the other frequency domain. FR1 is a frequency band in a range of 450 to 6000 MHz. FR2 is a frequency band in a range of 24250 to 52600 MHz.

In the operation of the above-described embodiment, the message including the frequency-related information may be another existing message or a newly defined message. In addition, the UE 100 (second communicator 120B) may transmit the frequency-related information to the base station 210B1 using a MAC message or a control channel (for example, a physical uplink control channel (PUCCH)).

The steps in the operation of the above-described embodiment may not necessarily be performed in chronological order according to the order described in the flow diagram or sequence diagram. For example, the steps in the operation may be performed in an order different from the order described as the flow diagram or sequence diagram, or may be performed in parallel. In addition, some of the steps in the operation may be removed and additional steps may be added to the processing. Furthermore, each operation flow described above is not necessarily implemented separately and independently and a combination of two or more operation flows can be implemented. For example, some steps of one operation flow may be added to another operation flow, or some steps of one operation flow may be replaced with some steps of another operation flow.

A program may be provided for causing a computer to execute each processing to be performed by the UE 100 or the base station 210. The program may be recorded on a computer readable medium. By using the computer readable medium, the program can be installed in the computer. Here, the computer readable medium on which the program is recorded may be a non-transitory recording medium. The non-transitory recording medium is not particularly limited to, but may be, for example, a recording medium such as a CD-ROM (Compact Disk Read Only Memory) or a DVD-ROM (Digital Versatile Disc Read Only Memory). Furthermore, a circuit that executes each processing to be performed by the UE 100 or the base station 210 may be integrated, and at least a part of the UE 100 or the base station 210 may be configured as a semiconductor integrated circuit (chipset, SoC (system-on-chip)).

Note that, in the above-described embodiment, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

The invention claimed is:

1. A communication apparatus configured to communicate with a plurality of networks including a first network and a second network, and supporting Multi-Universal Subscriber Identity Module (MUSIM) operation, the communication apparatus comprising:

a receiver configured to receive, from a base station of the first network, first information for configuring the communication apparatus to provide second information and third information;

a transmitter configured to transmit, in a case where the communication apparatus is in a Radio Resource Control (RRC) connected state in the first network and based on the first information, to the base station of the first network, a user equipment (UE) assistance information message including the second information and the third information, the second information indicating frequency bands for which the communication apparatus has a preference in MUSIM operation, and the third information indicating frequency bands that the communication apparatus does not prefer;

wherein the second information and the third information include a list of identifiers for the frequency bands.

2. The communication apparatus according to claim 1, wherein the first information and the second information are used by the base station of the first network to determine a particular frequency band for communication with the communication apparatus.

3. A base station of a first network configured to communicate with a communication apparatus, the communication apparatus being configured to communicate with a plurality of networks including the first network and a second network, and supporting Multi-Universal Subscriber Identity Module (MUSIM) operation, the base station comprising:

a transmitter configured to transmit, to the communication apparatus, first information for configuring the communication apparatus to provide second information and third information;

a receiver configured to receive, in a case where the communication apparatus is in a Radio Resource Control (RRC) connected state in the first network and based on the first information, from the communication apparatus, a user equipment (UE) assistance information message including the second information and the third information, the second information indicating frequency bands for which the communication apparatus has a preference in MUSIM operation, the third information indicating frequency bands that the communication apparatus does not prefer;

wherein the second information and the third information include a list of identifiers for the frequency bands.

4. The base station of the first network according to claim 3, wherein the first information and the second information are used by the base station of the first network to determine a particular frequency band for communication with the communication apparatus.

5. A communication control method performed by a communication apparatus configured to communicate with a plurality of networks including a first network and a second network, and supporting Multi-Universal Subscriber Identity Module (MUSIM) operation, the communication control method comprising the steps of:

receiving, from a base station of the first network, first information for configuring the communication apparatus to provide second information and third information; and transmitting, in a case where the communication apparatus is in a Radio Resource Control (RRC) connected state in the first network and based on the first information, to the base station of the first network, a user equipment (UE) assistance information message including the second information and the third information, the second information indicating frequency bands for which the communication apparatus has a preference in MUSIM operation, the third information indicating frequency bands that the communication apparatus does not prefer;

wherein the second information and the third information include a list of identifiers for the frequency bands.

6. The communication control method according to claim 5, wherein the first information and the second information are used by the base station of the first network to determine a particular frequency band for communication with the communication apparatus.

* * * * *